United States Patent [19]

Sawada et al.

[11] Patent Number: 5,414,996
[45] Date of Patent: May 16, 1995

[54] DEVICE FOR DETECTING THE DEGREE OF DETERIORATION OF A CATALYST

[75] Inventors: Hiroshi Sawada, Gotenba; Toshio Inoue, Susono, both of Japan

[73] Assignee: Toyota Jidosha Kabushiki Kaisha, Toyota, Japan

[21] Appl. No.: 974,843

[22] Filed: Nov. 10, 1992

[30] Foreign Application Priority Data

Nov. 12, 1991 [JP] Japan ................... 3-295651

[51] Int. Cl.$^6$ .............................................. F01N 3/00
[52] U.S. Cl. ................................................. 60/277
[58] Field of Search ................... 60/277, 285; 123/683, 123/691

[56] References Cited

U.S. PATENT DOCUMENTS

| | | |
|---|---|---|
| 4,739,614 | 4/1988 | Katsuno et al. |
| 4,779,414 | 10/1988 | Nagai et al. ............. 60/285 |
| 4,831,838 | 5/1989 | Nagai et al. ............. 123/691 |
| 5,088,281 | 2/1992 | Izutani et al. ............ 60/285 |
| 5,099,647 | 3/1992 | Hamberg .................. 60/285 |
| 5,119,628 | 6/1992 | Uema et al. ............. 60/277 |
| 5,191,762 | 3/1993 | Kuroda et al. ........... 60/277 |

FOREIGN PATENT DOCUMENTS

| | | |
|---|---|---|
| 3443649 | 6/1986 | Germany . |
| 3916467 | 11/1990 | Germany . |
| 60-231155 | 11/1985 | Japan . |
| 61-185634 | 8/1986 | Japan . |
| 62-29711 | 2/1987 | Japan . |
| 63-97852 | 4/1988 | Japan . |
| 63-147941 | 6/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-57862 | 3/1991 | Japan . |
| 3-134241 | 6/1991 | Japan . |
| 3-175129 | 7/1991 | Japan . |
| 3-286160 | 12/1991 | Japan . |
| 2225860 | 6/1990 | United Kingdom . |

OTHER PUBLICATIONS

Detection of Catalyst Failure On–Vehicle Using The Dual Oxygen Sensor Method John W. Koupal, Michael A. Sabourin, and William B. Clemmens, U.S. Environmental Protection Agency, pp. 135–145.

SAE International, SAE Technical Paper Series–Detection of Catalyst Performance Loss Using On–Board Diagnostics, William B. Clemmens, Michael A. Sabourin and Thomas Rao, pp. 1–18.

*Primary Examiner*—Noah P. Kamen
*Attorney, Agent, or Firm*—Oliff & Berridge

[57] ABSTRACT

A catalyst deterioration detecting device comprising a first air-fuel ratio sensor and a second air-fuel ratio sensor which are arranged in the exhaust passage upstream and downstream of the catalyst, respectively. When the air-fuel ratio of the mixture fed into the engine is changed over from the lean air-fuel ratio $(A/F)_L$ to the rich air-fuel ratio $(a/F)_R$, the air-fuel ratio detected by the second air-fuel ratio sensor is changed to the rich air-fuel ratio $(A/F)_R$ after it is maintained at the stoichiometric air-fuel ratio for a time $AT_R$. The deterioration of the catalyst is detected based on the time $T_R$, the amount of air and the difference between the rich air-fuel ratio $(A/F)_R$ and the stoichiometric air-fuel ratio.

14 Claims, 19 Drawing Sheets

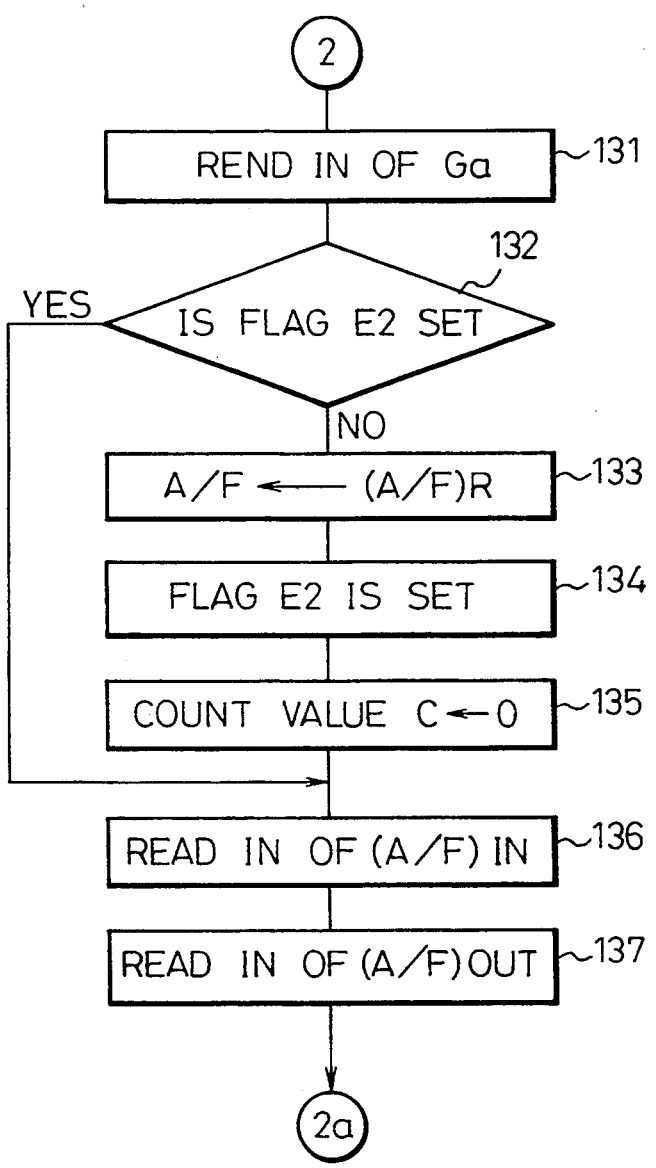

5,414,996

DEVICE FOR DETECTING THE DEGREE OF DETERIORATION OF A CATALYST

BACKGROUND OF THE INVENTION

1. Field of the Invention

The present invention relates to a device for detecting the degree of deterioration of a catalyst.

2. Description of the Related Art

In an engine, a catalyst is normally arranged in the exhaust passage to purify the exhaust gas. Such a catalyst, for example, a three way catalyst has an $O_2$ storage function such that it absorbs and stores excess oxygen existing in the exhaust gas when the air-fuel ratio of the air-fuel mixture fed into the engine cylinder becomes larger than the stoichiometric air-fuel ratio, i.e., when the air-fuel mixture becomes lean, and that the catalyst releases oxygen when the air-fuel ratio of the air-fuel mixture fed into the engine cylinder becomes smaller than the stoichiometric air-fuel ratio, i.e., when the air-fuel mixture becomes rich. Accordingly, where the air-fuel ratio is alternately changed on the rich side and the lean side of the stoichiometric air-fuel ratio, since excess oxygen is absorbed and stored in the three way catalyst due to the $O_2$ storage function thereof when the air-fuel mixture becomes lean, $NO_x$ is reduced. Conversely, when the air-fuel mixture becomes rich, since the oxygen which has been absorbed and stored in the three way catalyst is released therefrom, HC and CO are oxidized. Accordingly, Nox, HC and CO can be purified at the same time.

Therefore, in a conventional engine, an air-fuel ratio detector for detecting the air-fuel ratio of the air-fuel mixture fed into the engine cylinder is arranged in the exhaust passage upstream of the catalyst. When the air-fuel mixture becomes lean, the amount of fuel to be fed is increased and, when the air-fuel mixture becomes rich, the amount of fuel to be fed is reduced. As a result, the air-fuel ratio is alternately changed on the rich side and the lean side of the stoichiometric air-fuel ratio, and thus the amount of NOx, HC and CO is reduced at the same time.

However, if the three way catalyst deteriorates, the purifying rate of exhaust gas by the three way catalyst is reduced. In this case, since the exhaust gas is purified due to the $O_2$ storage function of the three way catalyst, if the $O_2$ storage function is weakened, the three way catalyst deteriorates. Accordingly, if the fact that the $O_2$ storage function is weakened can be detected, the deterioration of the three way catalyst can be detected.

Therefore, in a known engine, a second air-fuel ratio sensor is additionally arranged in the exhaust passage downstream of the three way catalyst. The air-fuel mixture fed into the engine cylinder is changed over from a rich mixture to a lean mixture after the air-fuel mixture is maintained at, for example, a rich mixture for a fixed time. After the changeover of the air-fuel mixture from the rich mixture to the lean mixture, the air-fuel ratio detected by the second air-fuel ratio sensor is changed from the rich side to the lean side of the stoichiometric air-fuel ratio with a time interval. In this case, if this time interval is shorter than a predetermined time, it is determined that the three way catalyst is deteriorated. In this engine, the deterioration of the three way catalyst is detected by noting the fact that, if the $O_2$ storage function is weakened, when the air-fuel mixture fed into the engine cylinder is changed over, for example, from a rich mixture to a lean mixture, the length of time during which the second air-fuel ratio thereafter continues to produce a rich signal indicating that the air-fuel ratio is on the rich side becomes short.

Now, the ability of the three way catalyst for reducing $NO_x$ and oxidizing CO and HC decreases as the actual amount of oxygen which can be stored in the three way catalyst is reduced. Accordingly, the actual amount of oxygen which can be stored in the three way catalyst correctly represents the degree of deterioration of the three way catalyst. Therefore, to correctly detect the degree of deterioration of the three way catalyst, it is necessary to correctly detect the actual amount of oxygen which can be stored in the three way catalyst. In this case, the actual amount of oxygen which can be stored in the three way catalyst cannot be found based on only the length of time during which the second air-fuel ratio continues to produce the rich signal in the above-mentioned engine, and therefore, in the above-mentioned engine, a problem arises in that it is impossible to correctly detect the degree of deterioration of the three way catalyst.

SUMMARY OF THE INVENTION

An object of the present invention is to provide a device capable of correctly detecting the degree of deterioration of a catalyst.

According to the present invention, there is provided a device for detecting the degree of deterioration of a catalyst having an oxygen storage function, the device comprising: an exhaust gas passage in which the catalyst is arranged, an exhaust gas produced by burning fuel flowing within the exhaust gas passage; an air-fuel ratio sensor arranged in the exhaust gas passage downstream of the catalyst to detect an air-fuel ratio; air-fuel ratio changeover means for changing over the air-fuel ratio at the upstream side of the catalyst between a predetermined rich air-fuel ratio and a predetermined lean air-fuel ratio; gas amount detecting means for detecting an amount of the exhaust gas passing through the catalyst during a time from when the air-fuel ratio is changed over from one of the predetermined rich air-fuel ratio and the predetermined lean air-fuel ratio to the other predetermined air-fuel ratio to when the air-fuel ratio detected by the air-fuel ratio sensor becomes approximately equal to the other predetermined air-fuel ratio; calculating means for calculating an amount of oxygen stored in the catalyst from the amount of the exhaust gas and a difference between the other predetermined air-fuel ratio and the stoichiometric air-fuel ratio; and deterioration determining means for determining a degree of deterioration of the catalyst on the basis of the amount of oxygen.

The present invention may be more fully understood from the description of preferred embodiments of the invention set forth below, together with the accompanying drawings.

BRIEF DESCRIPTION OF THE DRAWINGS

In the drawings:

FIGS. 7A through 7F are a flow chart for detecting the degree of deterioration of the catalyst;

DESCRIPTION OF PREFERRED EMBODIMENTS

Figure 1:
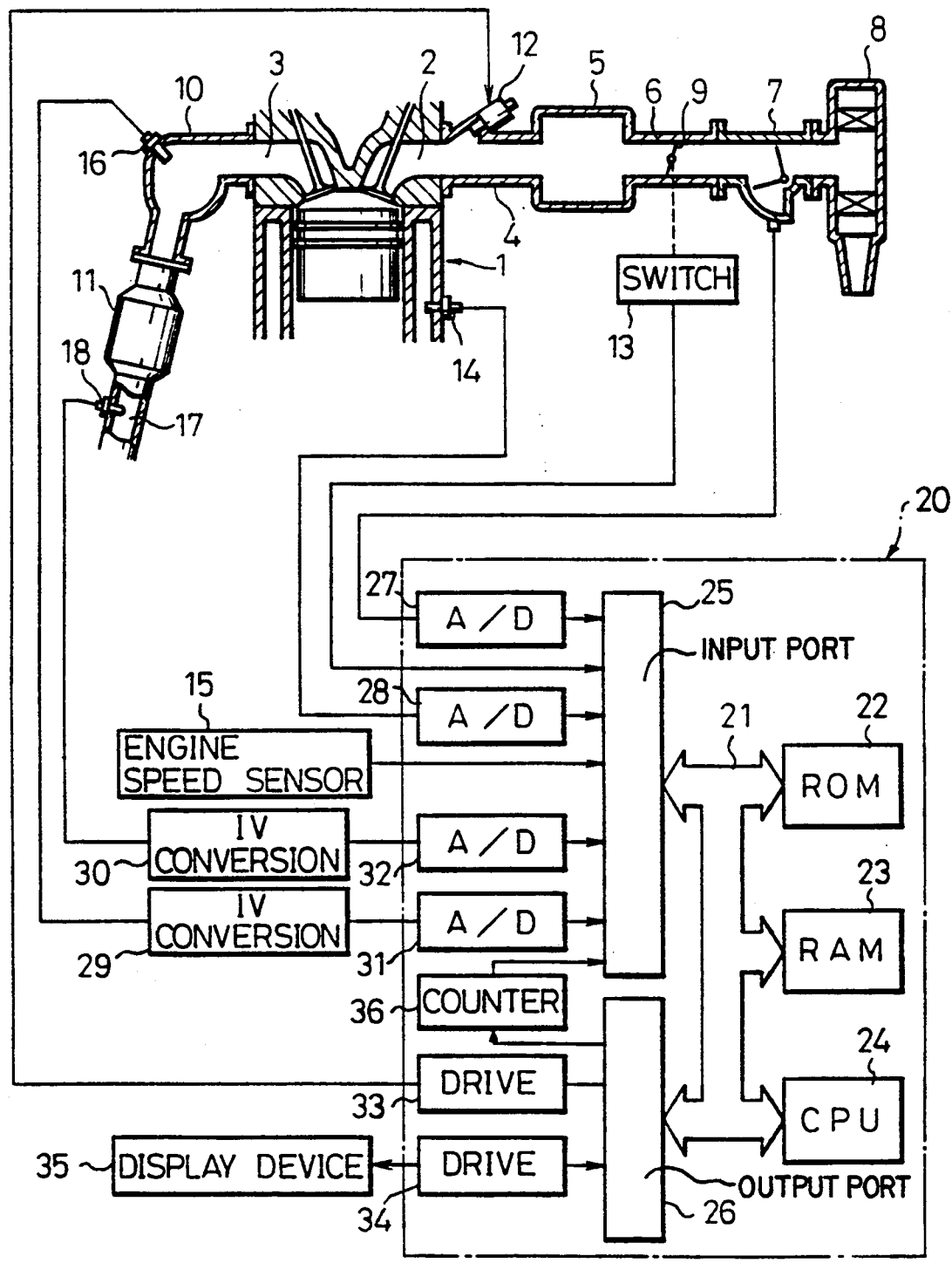
FIG. 1 is a general view of an engine.

Referring to FIG. 1, reference numeral 1 designates an engine body, 2 an intake port and 3 an exhaust port. The intake port 2 is connected to a surge tank 5 via a corresponding branch pipe 4, and the surge tank 5 is connected to an air cleaner 8 via an intake duct 6 and an air flow meter 7. A throttle valve 9 is arranged in the intake duct 6. The exhaust port 3 is connected to a catalytic converter 11 containing a three way catalyst therein via an exhaust manifold 10. A fuel injector 12 which is controlled based on a signal output from an electronic control unit 20 is arranged in each branch pipe 4.

The electronic control unit 20 comprises a ROM (read only memory) 22, a RAM (random access memory) 23, a CPU (microprocessor etc.) 24, an input port 25 and an output port 26. The ROM 22, the RAM 23, the CPU 24, the input port 25 and the output port 26 are interconnected to each other via a bidirectional bus 21. The air flow meter 7 produces an output voltage which is proportional to the amount of air fed into the engine cylinder, and this output voltage is input into the input port 25 via an AD converter 27. An idle switch 13 which is made ON when the throttle valve 6 is in the idling position is attached to the throttle valve 6, and the output signal of this idle switch 13 is input into the input port 25. A coolant temperature sensor 14 producing an output voltage which is proportional to the temperature of the cooling water of the engine is mounted on the engine body 1, and the output voltage of the coolant temperature sensor 14 is put into the input port 25 via an AD converter 28. In addition, an engine speed sensor 15 which produces an output pulse representing the engine speed is connected to the input port 25.

A first air-fuel ratio sensor 16 is arranged in the exhaust passage upstream of the catalytic converter 11, for example, in the exhaust manifold 10, and a second air-fuel ratio sensor 18 is arranged in the exhaust passage 17 downstream of the catalytic converter 11. The first air-fuel ratio sensor 16 and the second air-fuel ratio sensor 18 are connected to the input port 25 via corresponding current-voltage converting circuits 29, 30 and corresponding AD converters 31, 32. The output port 26 is connected, on one hand, to the fuel injector 12 via a drive circuit 33 and, on the other hand, to a display device 35 for displaying the degree of deterioration of the catalyst via a drive circuit 34. In addition, the electronic control unit 20 further comprises a counter 36. This counter 36 is reset by the count reset signal output to the output port 26 and, once the counter 36 is reset, the counting up operation of the counter 36 is instantaneously started. The count value of this counter 36 is input into the input port 25.

Figure 2A:
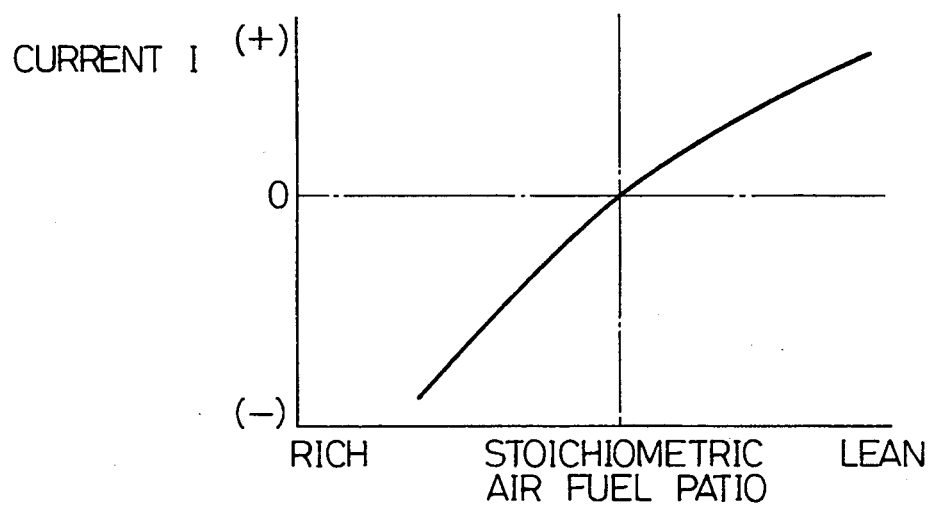
FIGS. 2A and 2B are diagrams illustrating the output of the air-fuel ratio sensor.
Figure 2B:
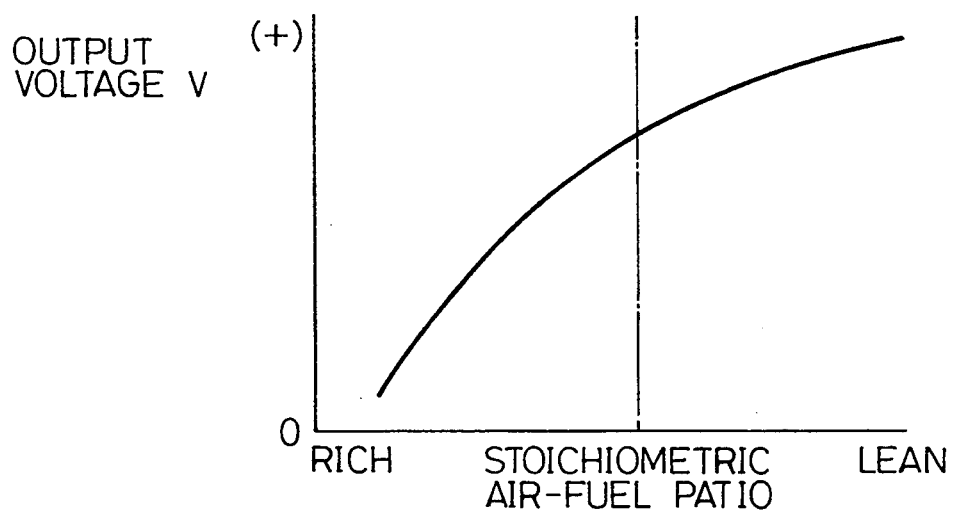

The first air-fuel ratio sensor 16 and the second air-fuel ratio sensor 18 have a construction such that the anode is formed on the inner face of the tubular member made of, for example, zirconia, and the cathode is formed on the outer face of the tubular member, and that the outer face of the cathode is covered by a porous layer, and a current I which varies in accordance with a change in the air-fuel ratio as illustrated in FIG. 2A flows between the anode and the cathode of the first air-fuel ratio sensor 16 and between the anode and the cathode of the second air-fuel ratio sensor 18. This current I is converted to a corresponding voltage in the corresponding current-voltage converting circuits 29, 30, and an output voltage V which varies in accordance with a change in the air-fuel ratio as illustrated in FIG. 2B is produced at the output terminals of the current-voltage converting circuits 29, 30. Accordingly, the air-fuel ratio can be detected by the output voltages V of the current-voltage converting circuits 29, 30.

In the embodiment according to the present invention, the fuel injection time TAU of the fuel injector 12 is calculated based on the following formula.

$$TAU = TP \cdot FAF \cdot GA \cdot C \cdot M$$

where
TP: basic fuel injection time
FAF: feedback correction coefficient
GA: learning coefficient
C: enrichment coefficient
M: air-fuel ratio determining coefficient The basic fuel injection time TP is a fuel injection time required to make the air-fuel ratio of air-fuel mixture fed into the engine equal to the stoichiometric air-fuel ratio, and this basic fuel injection time TP is stored in advance in the ROM 22 as a function of the engine load Q/N (the amount of air Q fed into the engine cylinder/the engine speed N) and the engine speed N.

The feedback correction coefficient FAF is controlled by the output signal of the first air-fuel ratio sensor 16 in order to maintain the air-fuel ratio at a target air-fuel ratio. This feedback correction coefficient FAF alternately increases and decreases relative to 1.0.

The learning coefficient GA is a coefficient for causing the feedback correction coefficient FAF to increase or decrease relative to 1.0.

The enrichment coefficient C is a coefficient for increasing the amount of fuel to be fed at the time of warm-up of the engine or at the time of acceleration of the engine. This enrichment coefficient is made 1.0 when the increase operation of the amount of fuel is not carried out.

The air-fuel ratio determining coefficient M is a coefficient for obtaining a target air-fuel ratio which is determined in advance in accordance with the operating state of the engine. The air-fuel ratio determining coefficient M is made 1.0 when the target air-fuel ratio is the stoichiometric air-fuel ratio.

Next, the feedback correction coefficient FAF and the learning coefficient GA will be briefly described with reference to FIGS. 3 and 4. Note that, if the target air-fuel ratio is $(A/F)_0$, the air-fuel ratio determining coefficient M is made the stoichiometric air-fuel ratio/the target air-fuel ratio $(A/F)_0$.

Figure 3:
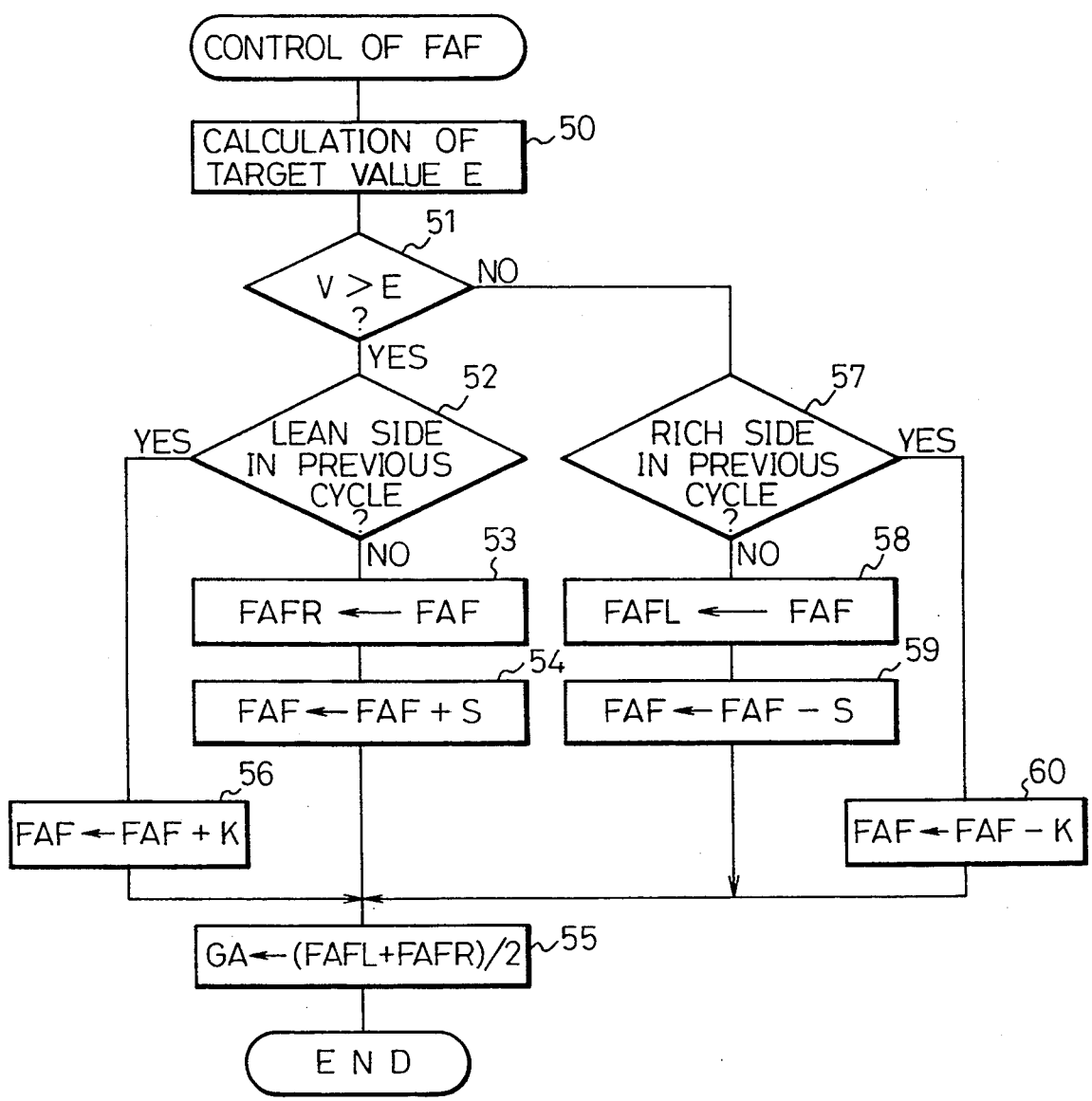
FIG. 3 is a flow chart showing control of the feedback correction coefficient.

FIG. 3 illustrates a routine processed by sequential interruptions which are executed at predetermined time intervals.

Referring to FIG. 3, in step 50, the target output voltage E of the current-voltage converting circuit 29 of the first air-fuel ratio sensor 16, which voltage E corresponds to the target air-fuel ratio $(A/F)_0$, is calculated based on the relationship illustrated in FIG. 2B. Where the air-fuel ratio determining coefficient M is made the stoichiometric air-fuel ratio/the target air-fuel ratio $(A/F)_0$, if the injection of fuel is carried out for the time TP·M, the air-fuel ratio becomes approximately equal to the target air-fuel ratio $(A/F)_0$. Accordingly, at this time, the output voltage of the current-voltage converting circuit 29 of the first air-fuel ratio sensor 16 becomes approximately equal to the target output voltage E.

If the target output voltage E is calculated in step 50, the routine goes to step 51, and it is determined whether or not the output voltage V of the current-voltage converting circuit 29 of the first air-fuel ratio 16 is higher than the target output voltage E, i.e., the air-fuel ratio detected by the first air-fuel ratio sensor 16 is on the lean side of the target air-fuel ratio $(A/F)_0$. If $V > E$, i.e., when the air-fuel ratio is on the lean side of the target air-fuel ratio $(A/F)_0$, the routine goes to step 52, and it is determined whether or not the air-fuel ratio was on the lean side of the target air-fuel ratio $(A/F)_0$ in the previous processing cycle. When the air-fuel ratio was not on the lean side of the target air-fuel ratio $(A/F)_0$, it is determined that the air-fuel ratio has changed from the rich side to the lean side, and the routine goes to step 53.

In step 53, the feedback correction coefficient FAF is memorized as FAFR. Then, in step 54, the skip value S is added to FAF, and then the routine goes to step 55. Conversely, if it is determined in step 52 that the air-fuel ratio was also on the lean side of the target air-fuel ratio $(A/F)_0$ in the previous processing cycle, the routine goes to step 56, and the integral value K is added to FAF ($K < S$). Then, the routine goes to step 55. Accordingly, as illustrated in FIG. 4, when the air-fuel ratio changes from the rich side to the lean side, the feedback correction coefficient FAF is abruptly increased by the skip value S and then gradually increased.

If it is determined in step 51 that $V \leq E$, i.e., the air-fuel ratio is on the rich side of the target air-fuel ratio $(A/F)_0$, the routine goes to step 57, and it is determined whether or not the air-fuel ratio was on the rich side of the target air-fuel ratio $(A/F)_0$ in the previous processing cycle. When the air-fuel ratio was not on the rich side, it is determined that the air-fuel ratio has changed from the lean side to the rich side, and the routine goes to step 58. In step 58, the feedback correction coefficient FAF is memorized as FAFL. Then, in step 59, the skip value S is subtracted from FAF, and then the routine goes to step 55. Conversely, if it is determined in step 57 that the air-fuel ratio was also on the rich side of the target air-fuel ratio $(A/F)_0$ in the previous processing cycle, the routine goes to step 60, and the integral value K ($K < S$) is subtracted from FAF. Then, the routine goes to step 55. Accordingly, as illustrated in FIG. 4, when the air-fuel ratio changes from the lean side to the rich side, the feedback correction coefficient FAF is abruptly reduced by the skip value S and then gradually reduced.

Then, in step 55, the mean value of FAFL and FAFR is memorized as the learning coefficient GA. If the feedback correction coefficient FAF becomes larger than 1.0, since the learning coefficient GA also becomes larger than 1.0, the value of FAF becomes small. Conversely, if FAF becomes smaller than 1.0, since GA also becomes smaller than 1.0, the value of FAF becomes large. Thus, FAF is caused to alternately increase and decrease relative to 1.0.

Figure 4:
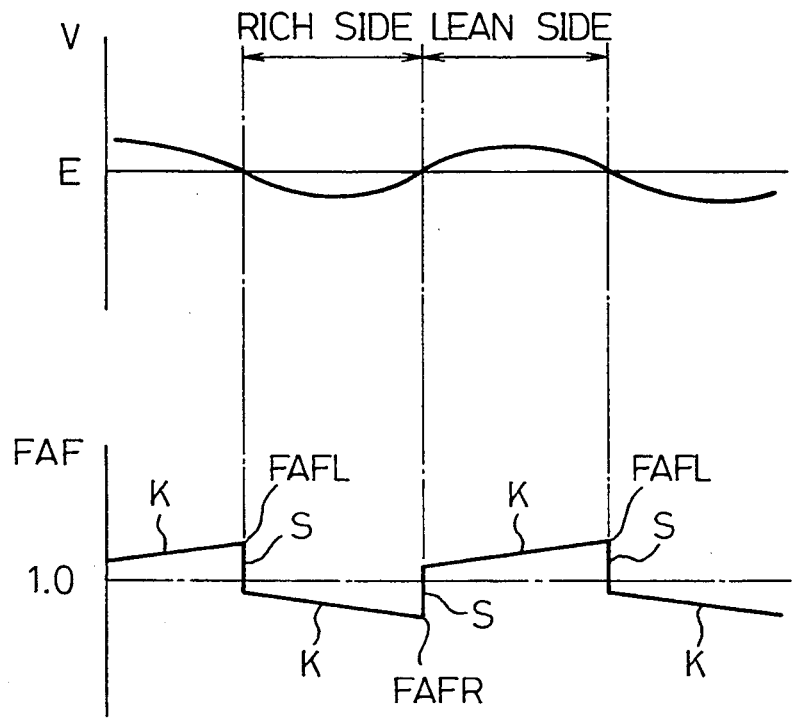
FIG. 4 is a diagram illustrating a change in the feedback correction coefficient.

The changing pattern of the feedback correction coefficient FAF illustrated in FIG. 4 does not change even if the target air-fuel ratio $(A/F)_0$ changes. For example, even if the target air-fuel ratio $(A/F)_0$ is the stoichiometric air-fuel ratio, FAF is caused to alternately increase and decrease relative to 1.0. Accordingly, where the target air-fuel ratio $(A/F)_0$ is the stoichiometric air-fuel ratio, i.e., the air-fuel ratio determining coefficient is equal to 1.0, if the value of FAF is made a fixed value 1.0, i.e., the feedback control of the air-fuel ratio is stopped, the air-fuel ratio is maintained at the stoichiometric air-fuel ratio. Similarly, where the target air-fuel ratio $(A/F)_0$ is not the stoichiometric air-fuel ratio, if the air-fuel ratio determining coefficient M is made a value corresponding to the target air-fuel ratio $(A/F)_0$ and, in addition, FAF is made a fixed value 1.0, the air-fuel ratio is maintained at the target air-fuel ratio $(A/F)_0$. Accordingly, to make the air-fuel ratio equal to the target air-fuel ratio $(A/F)_0$, it is sufficient to merely make the air-fuel ratio determining coefficient M a value corresponding to the target air-fuel ratio $(A/F)_0$ and make FAF a fixed value 1.0.

Figure 5:
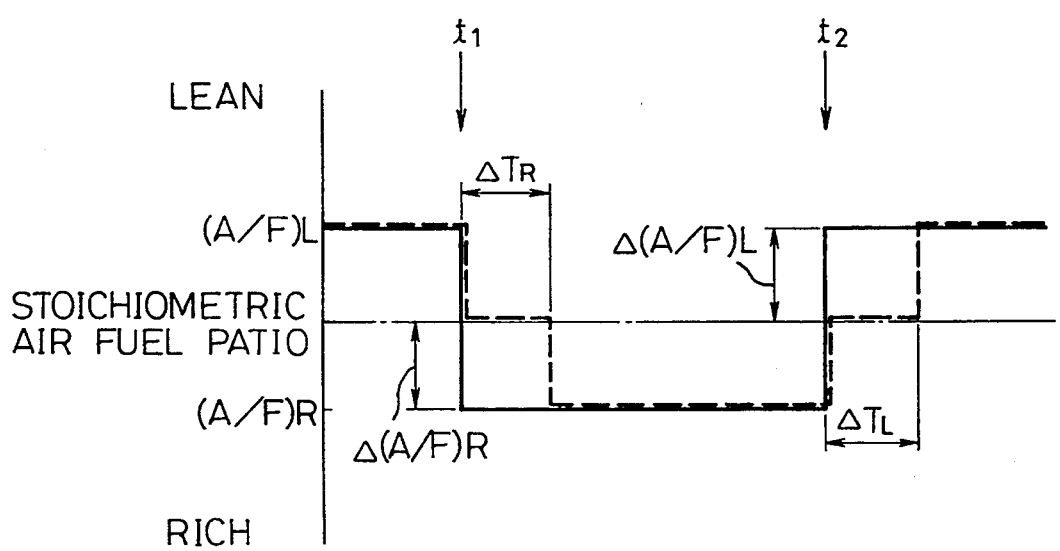
FIG. 5 is a diagram illustrating changes in air-fuel ratios detected by the first air-fuel ratio sensor and the second air-fuel ratio sensor.

A method of detecting the actual amount of oxygen stored in the three way catalyst will be hereinafter described with reference to FIG. 5. In FIG. 5, the solid line indicates an air-fuel ratio detected by the first air-fuel ratio sensor 16, and the broken line indicates an air-fuel ratio detected by the second air-fuel ratio sensor 18. In addition, FIG. 5 illustrates the case where the air-fuel ratio of the air-fuel mixture fed into the engine cylinder is caused to forcibly change over from the lean air-fuel ratio $(A/F)_L$ (the air-fuel ratio on the lean side of the stoichiometric air-fuel ratio) to the rich air-fuel ratio $(A/F)_R$ (the air-fuel ratio on the rich side of the stoichiometric air-fuel ratio) at the time $t_1$, and the air-fuel ratio of the air-fuel mixture fed into the engine cylinder is caused to forcibly change over from the rich air-fuel ratio $(A/F)_R$ to the lean air-fuel ratio $(A/F)_L$ at the time $t_2$.

As can be seen from FIG. 5, when the air-fuel ratio of the mixture fed into the engine cylinder is caused to change over from the lean air-fuel ratio $(A/F)_L$ to the rich air-fuel ratio $(A/F)_R$ at the time $t_1$, the air-fuel ratio detected by the first air-fuel ratio sensor 16 also changes from the lean air-fuel ratio $(A/F)_L$ to the rich air-fuel ratio $(A/F)_R$ and, when the air-fuel ratio of the mixture fed into the engine cylinder is caused to change over from the rich air-fuel ratio $(A/F)_R$ to the lean air-fuel ratio $(A/F)_L$ at the time $t_2$, the air-fuel ratio detected by the first air-fuel ratio sensor 16 also changes from the rich air-fuel ratio $(A/F)_R$ to the lean air-fuel ratio $(A/F)_L$.

Conversely, as illustrated by the broken line in FIG. 5, the air-fuel ratio detected by the second air-fuel ratio sensor 18 changes in a pattern which is different from that of the air-fuel ratio detected by the first air-fuel ratio sensor 16. Namely, when the air-fuel ratio of the mixture fed into the engine cylinder is caused to change over from the lean air-fuel ratio $(A/F)_L$ to the rich air-fuel ratio $(A/F)_R$ at the time $t_1$, the air-fuel ratio detected by the second air-fuel ratio sensor 18 changes from the lean air-fuel ratio $(A/F)_L$ to the stoichiometric air-fuel ratio. After this, the air-fuel ratio detected by the second air-fuel ratio sensor 18 is maintained at the stoichiometric air-fuel ratio for the time $\Delta T_R$ and then changes to the rich air-fuel ratio $(A/F)_R$. Conversely, when the air-fuel ratio of the mixture fed into the engine cylinder is caused to change over from the rich air-fuel ratio $(A/F)_R$ to the lean air-fuel ratio $(A/F)_L$ at the time $t_2$, the air-fuel ratio detected by the second air-fuel ratio sensor 18 changes from the rich air-fuel ratio $(A/F)_R$ to the stoichiometric air-fuel ratio. After this, the air-fuel ratio detected by the second air-fuel ratio sensor 18 is maintained at the stoichiometric air-fuel ratio and then changes to the lean air-fuel ratio $(A/F)_L$.

It is due to the oxygen storage function of the three way catalyst that, when the air-fuel ratio of the mixture fed into the engine cylinder is changed over as mentioned above, the air-fuel ratio detected by the second air-fuel ratio detector 18 is maintained at the stoichiometric air-fuel ratio for the times $\Delta T_R$ and $\Delta T_L$. Namely, when the air-fuel ratio of the mixture fed into the engine cylinder is the lean air-fuel ratio, excess oxygen exists in the exhaust gas, and this excess oxygen is absorbed and stored in the three way catalyst. When the air-fuel ratio of the mixture fed into the engine cylinder is caused to change over from the lean air-fuel ratio $(A/F)_L$ to the rich air-fuel ratio $(A/F)_R$ at the time $t_1$, the exhaust gas contains therein the amount of unburned components such as CO, HC, $H_2$, which amount corresponds to the air-fuel ratio and, at this time, the oxygen stored in the three way catalyst is used for oxidizing the unburned components. The air-fuel ratio detected by the second air-fuel ratio sensor 18 is maintained at the stoichiometric air-fuel ratio for the time for which the oxidizing operation of the unburned components by the oxygen stored in the three way catalyst is carried out, i.e., for the time $\Delta T_R$ in FIG. 5. After this, when the oxygen stored in the three way catalyst disappears, the oxidizing operation of the unburned components is no longer carried out, and thus the air-fuel ratio detected by the second air-fuel ratio sensor 18 changes to the rich air-fuel ratio $(A/F)_R$.

After this, when the air-fuel ratio of the mixture fed into the engine cylinder is caused to change over from the rich air-fuel ratio $(A/F)_R$ to the lean air-fuel ratio $(A/F)_L$ at the time $t_2$, the absorbing operation of oxygen by the three way catalyst is started. The air-fuel ratio detected by the second air-fuel ratio sensor 18 is maintained at the stoichiometric air-fuel ratio for the time for which the absorbing operation of oxygen is carried out, i.e., for the time $\Delta T_R$ in FIG. 5. After this, when the absorbing ability of oxygen of the three way catalyst is saturated, oxygen is no longer absorbed in the three way catalyst, and thus the air-fuel ratio detected by the second air-fuel ratio sensor 18 changes to the lean air-fuel ratio $(A/F)_L$. Since oxygen in the exhaust gas is taken away by the three way catalyst for the time for which the absorbing operation of oxygen is carried out, the unburned components such as HC, CO, $H_2$ in the exhaust gas take away oxygen from $NO_x$, and, as a result, $NO_x$ is reduced. After this, when the absorbing ability of oxygen of the three way catalyst is saturated, the unburned components in the exhaust gas are oxidized by oxygen contained in the exhaust gas. As a result, since the reducing operation of $NO_x$ is no longer carried out, $NO_x$ is discharged from the three way catalyst.

The upper limit exists in the actual amount of oxygen which the three way catalyst is able to absorb and store therein and, if the type and size of the three way catalyst is determined, the actual amount of oxygen which the three way catalyst is able to absorb and store therein is accordingly determined. In this case, the amount of unburned components which can be oxidized and the amount of $NO_x$ which can be reduced are decreased as the actual amount of oxygen which the three way catalyzer is able to absorb and store therein is decreased. Accordingly, the purifying efficiency of the exhaust gas becomes low as the actual amount of oxygen which the three way catalyst is able to absorb and store therein is decreased. Whereas, if the three way catalyst deteriorates, the amount of the unburned components which can be oxidized and the amount of $NO_x$ which can be reduced are decreased, and thus the purifying efficiency of the exhaust gas becomes low. Accordingly, the actual amount of oxygen which the three way catalyst is able to absorb and store therein properly represents the degree of deterioration of the three way catalyst. FIG. 7 illustrates the relationship between the degree of deterioration of the three way catalyst and the actual amount of oxygen OS which can be absorbed and stored in the three way catalyst.

Accordingly, if the actual amount of oxygen which can be absorbed and stored in the three way catalyzer is detected, it is possible to correctly detect the degree of deterioration of the three way catalyst.

Assuming that the amount of air Go(g) is fed into the engine and, at this time, the air-fuel ratio of the mixture fed into the engine cylinder becomes equal to the rich air-fuel ratio $(A/F)_R$ illustrated in FIG. 5. At this time, the amount of air which is short is represented by [Stoichiometric air-fuel ratio-$(A/F)_R$]·Go(g). In this case, if [Stoichiometric air-fuel ratio-$(A/F)_R$] is represented by $\Delta(A/F)_R$, the amount of air which is short is represented by $\Delta(A/F)_R$·Go(g). In addition, at this time, if the ratio of the amount of oxygen contained in air is represented by $\alpha$, the amount of oxygen which is short is represent by $\alpha \cdot \Delta(A/F)_R$·Go(g). This amount of oxygen $\alpha \cdot \Delta(A/F)_R$·Go(g) which is short is released from the three way catalyst during the time $\Delta T_R$ in FIG. 5, and thus the amount of oxygen which is stored in the three way catalyst becomes equal to $\alpha \cdot \Delta(A/F)_R$·Go(g). Accordingly, if the amount of air Go which is fed into the engine cylinder during the time $\Delta T_R$ is detected, the amount of oxygen which is stored in the three way catalyst can be found.

Where the air-flow meter 7 is used for detecting the amount of air fed into the engine cylinder as illustrated in FIG. 1, the air flow meter 7 produces an output voltage which is proportional to the amount of air Ga(g/sec) fed into the engine cylinder per a unit time. Accordingly, if the amount of air Ga(g/sec) detected by the air flow meter 7 is multiplied by $\Delta T_R$, the resultant Ga·$\Delta T_R$ indicates the amount of air Go which is fed into the engine cylinder during the time $\Delta T_R$. Accordingly, where the air flow meter 7 is used, the amount of oxygen which can be absorbed and stored in the three way catalyst is represented by $\alpha \cdot \Delta(A/F)_R \cdot Ga \cdot \Delta T_R$. In this case, the amount of air Ga. $\Delta$Ta fed into the engine cylinder is approximately equal to the amount of exhaust gas passing through the three way catalyst, and $\Delta(A/F)_R$ indicates a difference in the air-fuel ratio relative to the stoichiometric air-fuel ratio. Accordingly, in other words, the amount of oxygen which can be absorbed and stored in the three way catalyst can be obtained from the amount of exhaust gas passing through the three way catalyst and the difference in the air-fuel ratio relative to the stoichiometric air-fuel ratio.

Conversely, assuming that the amount of air Go(g) is fed into the engine cylinder and, at this time, the air-fuel ratio of the mixture fed into the engine cylinder becomes equal to the lean air-fuel ratio $(A/F)_L$ illustrated in FIG. 5, at this time, the amount of excess air is represented by $[(A/F)_L\text{-stoichiometric air-fuel ratio}] \cdot Go(g)$. In this case, if $[(A/F)_L\text{-stoichiometric air-fuel ratio}]$ is represented by $\Delta(A/F)_L$, the amount of excess air is represented by $\Delta(A/F)_L \cdot Go(g)$. Accordingly, if the above-mentioned $\alpha$ is used, the amount of excess oxygen is represented by $\alpha \cdot \Delta(A/F)_L \cdot Go(g)$. The amount of excess oxygen $\alpha \cdot \Delta(A/F)_L \cdot Go(g)$ is stored in the three way catalyst during the time $\Delta T_L$ in FIG. 5. Accordingly, the actual amount of oxygen which can be stored in the three way catalyst becomes equal to $\alpha \cdot \Delta(A/F)_L \cdot Go(g)$.

Accordingly, if the above-mentioned Ga and $\Delta T_L$ illustrated in FIG. 5 are used, the actual amount of oxygen which can be stored in the three way catalyst is represented by $\alpha \cdot \Delta(A/F)_L \cdot Ga \cdot \Delta T_L$. Since the actual amount of air obtained based on $\Delta(A/F)_L$ and $\Delta T_L$ becomes equal to the actual amount of air obtained based on $\Delta(A/F)_R$ and $\Delta T_R$, if $\Delta(A/F)_L$ is made equal to $\Delta(A/F)_R$ in FIG. 5, $\Delta T_L$ becomes equal to $\Delta T_L$.

As mentioned above, the actual amount of oxygen which can be absorbed and stored in the three way catalyst is represented by $\alpha \cdot \Delta(A/F)_R \cdot Ga \cdot \Delta T_R$ or $\alpha \cdot \Delta(A/F)_L \cdot Ga \cdot \Delta T_L$. In this case, if the air-fuel ratio determining coefficient M is made, for example, a value corresponding to the rich air-fuel ratio $(A/F)_R$, since the air-fuel ratio of the mixture fed into the engine cylinder becomes equal to the rich air-fuel ratio $(A/F)_R$ as mentioned above, it is possible to obtain $\Delta(A/F)_R$ and $\Delta(A/F)_L$ from the air-fuel ratio determining coefficient M. In this case, naturally, $\Delta(A/F)_R$ and $\Delta(A/F)_L$ can be obtained by the output signal of the first air-fuel ratio sensor 16. In addition, $\alpha$ is known, and Ga can be obtained from the output signal of the air flow meter 7. Furthermore, $\Delta T_R$ can be obtained by detecting the length of time between the time $t_1$ and the time at which the air-fuel ratio detected by the second air-fuel ratio sensor 18 becomes the rich air-fuel ratio $(A/F)_R$, and $\Delta T_L$ can be obtained by detecting the length of time between the time $t_2$ and the time at which the air-fuel ratio detected by the second air-fuel ratio sensor 18 becomes the lean air-fuel ratio $(A/F)_L$.

In this case, it can be determined whether the air-fuel ratio detected by the second air-fuel ratio sensor 18 becomes the rich air-fuel ratio $(A/F)_R$ or the lean air-fuel ratio $(A/F)_L$ by determining whether or not air-fuel ratio detected by the second air-fuel ratio sensor 18 becomes equal to the air-fuel ratio detected by the first air-fuel ratio sensor 16, or whether or not the air-fuel ratio detected by the second air-fuel ratio sensor 18 becomes equal to the target air-fuel ratio determined by the air-fuel ratio determining coefficient M. Accordingly, $\alpha \cdot \Delta(A/F)_R \cdot Ga \cdot \Delta T_R$ and $\alpha \cdot \Delta(A/F)_L \cdot Ga \cdot \Delta T_L$ can be calculated. This is the first method for detecting the actual amount of oxygen which can be absorbed and stored in the three way catalyst.

Where $\Delta T_R$ or $\Delta T_L$ is detected by determining whether or not the air-fuel ratio detected by the second air-fuel ratio sensor 18 becomes equal to the target air-fuel ratio determined by the air-fuel ratio determining coefficient M as mentioned above, it is not necessary to arrange the first air-fuel ratio sensor 16 from the point of view of detecting the actual amount of oxygen, and it is enough to arrange only the second air-fuel ratio 18.

The second method for detecting the actual amount of oxygen which can be absorbed and stored in the three way catalyst is a method of obtaining Ga, $\Delta(A/F)_R$ and $\Delta(A/F)_L$ many times during the $\Delta T_R$ and $\Delta T_L$. Namely, in this second method, the times $\Delta T_R$ and $\Delta T_L$ are divided into continuous times $\Delta t_1, \Delta t_2, \ldots \Delta t_n$, and the actual amount of oxygen $\Delta OS (= \alpha \cdot \Delta(A/F)_R \cdot Ga \cdot \Delta t$ or $\alpha \cdot \Delta(A/F)_L \cdot Ga \cdot \Delta t)$ which is stored in the three way catalyst during each time $\Delta t$ is obtained. Then, the total actual amount of oxygen which can be stored in the three way catalyst is obtaining by summing up all the $\Delta OS$. This second method has an advantage that it is possible to correctly detect the entire actual amount of oxygen which can be stored in the three way catalyst even if the amount of air Ga changes during the time $\Delta T_R$ or $\Delta T_L$, or even if $\Delta(A/F)_R$ or $\Delta(A/F)_L$ changes although they actually change little.

FIGS. 7A through 7F illustrate a routine which is repeatedly executed for carrying out the above-mentioned first method, and FIGS. 8A through 8G illustrate a routine which is repeatedly executed for carrying out the above-mentioned second method. In addition, FIG. 9 illustrates a time chart common to both routines.

Referring to FIGS. 7A through 7F, in step 100, it is determined whether or not the condition for executing the detection of deterioration of the catalyst stands. For example, when the temperature of the cooling water of the engine is higher than a predetermined temperature, when both the air-fuel ratio sensors 16, 18 produce a regular output signal, and when the operating state of the engine is not an idling state, it is determined that the executing condition stands. When the executing condition does not stand, flags X1, X2, X3, E1, E2, E3, END1, END2, Z1, Z2 and W which are used in this routine are reset in steps 101, 102, 103 and 104. Then, the processing cycle is completed.

If the executing condition stands, the routine goes from step 100 to step 110, and it is determined whether or not the flag X1 is set. At this time, since the flag X1 is reset, the routine goes to step 130, and it is determined whether or not the flag X2 is set. At this time, since the flag X2 is reset, the routine goes to step 150, and it is determined whether or not the flag X3 is set. At this time, since the flag X3 is reset, the routine goes to step 170. In step 170, the flag X1 indicating that the first stage should be executed is set. Then, the routine goes to step 171 shown in FIG. 7F, and it is determined whether or not the flag END1 is set. At this time, since the flag END1 is reset, the routine goes to step 181, and it is determined whether or not the flag END2 is set. At this time, since the flag END2 is reset, the processing cycle is completed.

Figure 7A:
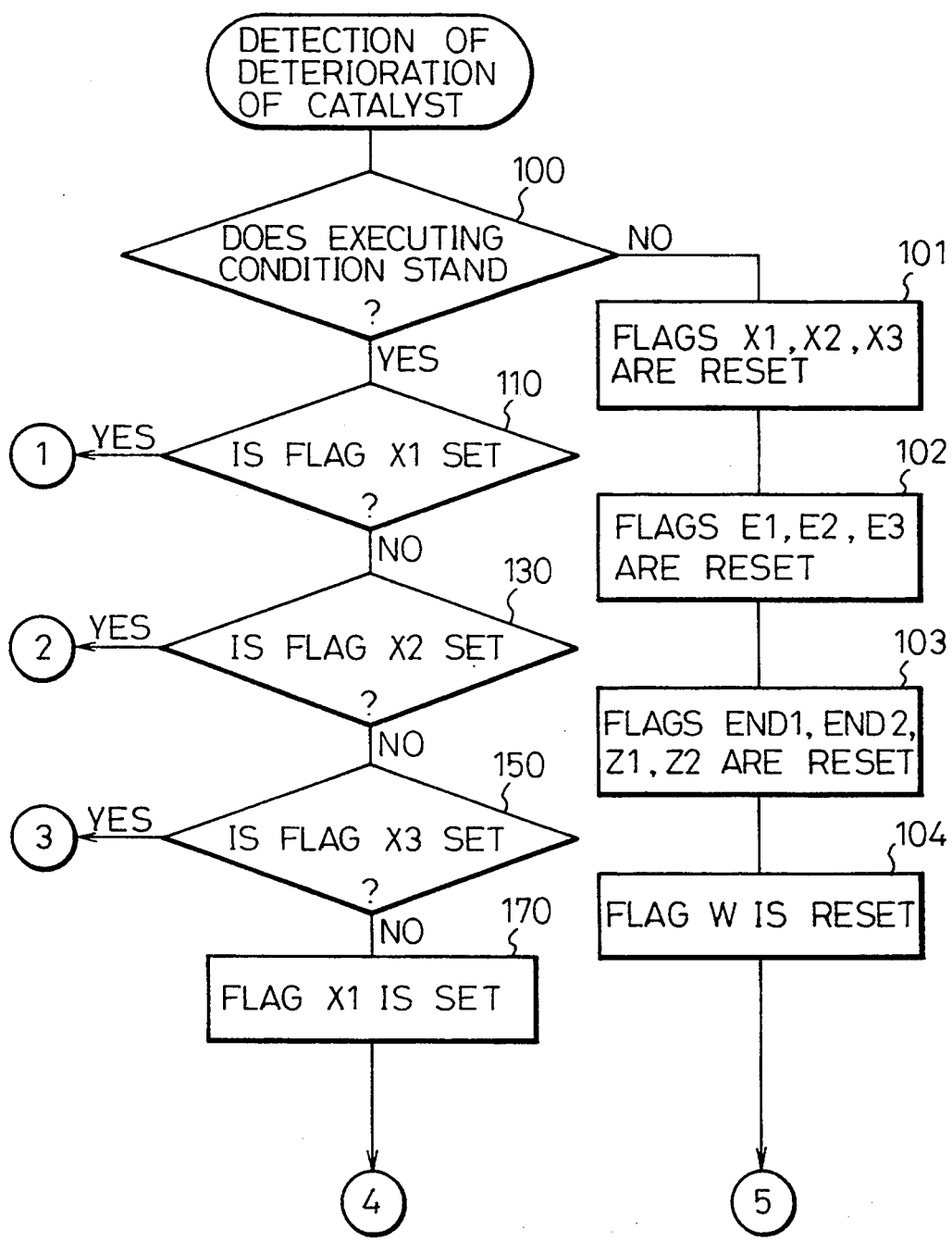
Figure 7B:
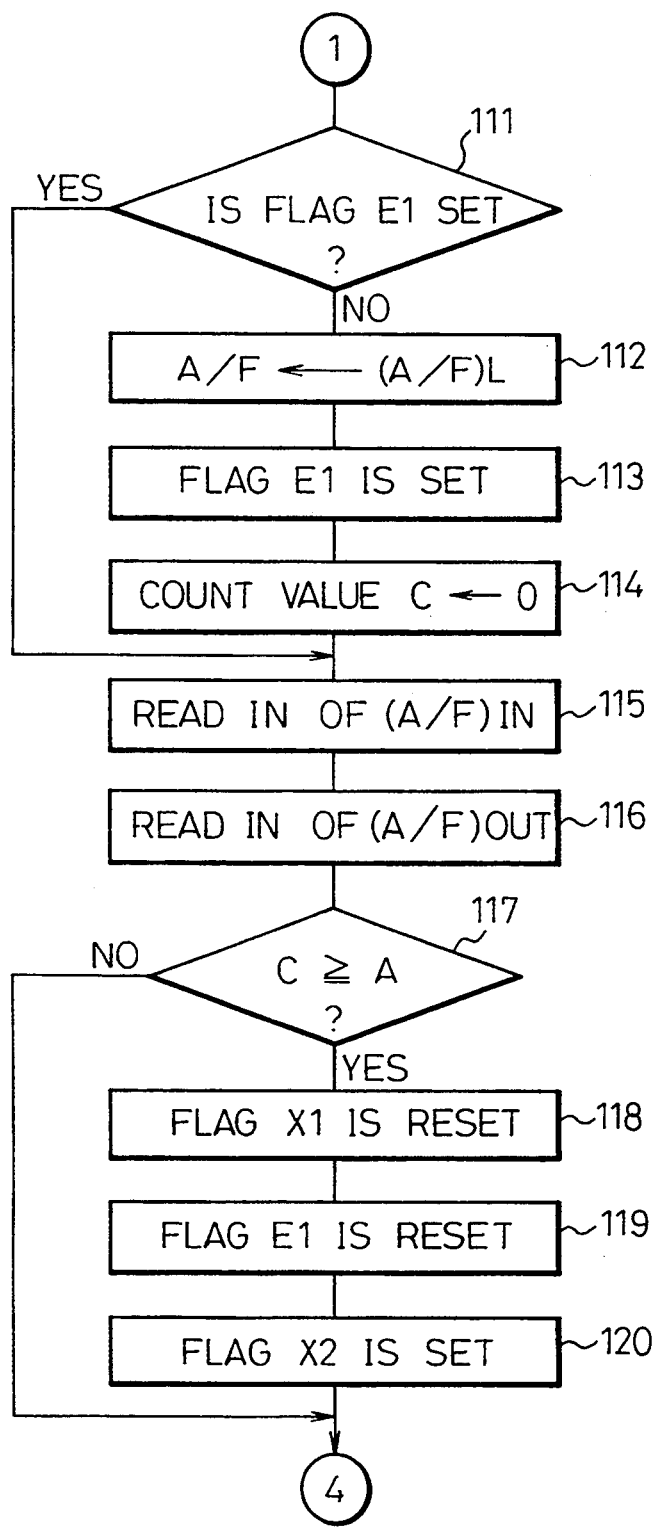

In the next processing cycle, since it is determined in step 110, shown in FIG. 7A, that the flag X1 is set, the routine goes to step 111 shown in FIG. 7B. In step 111, it is determined whether or not the flag E1 indicating that the first stage is being executed is set. At this time, since the flag E1 is reset, the routine goes to step 112. In step 112, the air-fuel ratio A/F of the mixture fed into the engine cylinder is made the predetermined lean air-fuel ratio $(A/F)_L$. Namely, the air-fuel ratio determining coefficient M is made a value corresponding to the lean air-fuel ratio $(A/F)_L$, and the feedback correction coefficient FAF is made a fixed value 1.0. Then, in step 113, the flag E1 is set, and then the routine goes to step 114. In step 114, a data indicating that the counter 36 is to be reset is output to the output port 26, and thereby the count value of the counter 36 is made zero. When the counter 36 is reset, the counting up operation of the counter 36 is instantaneously started.

Then, in step 115, the air-fuel ratio $(A/F)_{in}$ detected by the first air-fuel ratio sensor 16 is read in, and then, in step 116, the air-fuel ratio $(A/F)_{out}$ detected by the second air-fuel ratio sensor 18 is read in. Then, in step 117, it is determined whether or not the count value C exceeds a predetermined value A. This value A is stored in advance in the ROM 22 as a function of the lean air-fuel ratio $(A/F)_L$ and the amount of air Ga detected by the air-flow meter 7. When the routine goes to step 117 for the first time, since the count value C is lower than the value A, the routine jumps to step 171 shown in FIG. 7F, and then the processing cycle is completed via step 181. Note that the predetermined value A is determined so that oxygen can be absorbed and stored in the three way catalyst to the absorption limit by the time the count C reaches the value A.

In the next processing cycle, the routine jumps from step 111 to step 115. When the count value C becomes equal to the value A, the routine goes from step 117 to step 118, and the flag X1 is reset. Then, in steps 119, the flag E1 is reset. Then, in step 120, the flag X2 indicating that the second stage should be executed is set, and then the processing cycle is completed.

If the flag X1 is reset, and the flag X2 is set, the routine goes from step 130 shown in FIG. 7A to step 131 shown in FIG. 7C in the next processing cycle. In the step 131, the amount of air Ga detected by the air flow meter 7 is read in. Then, in step 132, it is determined whether or not the flag E2 indicating that the second stage is being executed is set. At this time, since the flag E2 is reset, the routine goes to step 133. In step 133, the air-fuel ratio A/F of the mixture fed into the engine cylinder is made a predetermined rich air-fuel ratio $(A/F)_R$. Namely, the air-fuel ratio determining coefficient M is made a value corresponding to the rich air-fuel ratio $(A/F)_R$, and the feedback correction coefficient FAF is made a fixed value 1.0. Accordingly, as can be seen from FIG. 9, when the count value C reaches the predetermined value A, the air-fuel ratio of the mixture fed into the engine is changed over from the lean air-fuel ratio $(A/F)_L$ to the rich air-fuel ratio $(A/F)_R$. Then, in step 134, the flag E2 is set, and then the routine goes to step 135. In step 135, a data indicating that the counter 36 is to be reset is output to the output port 26, and thereby the count value C of the counter 36 is made zero. When the counter 36 is reset, the counting up operation of the counter 36 is instantaneously started.

Then, in step 136, the air-fuel ratio $(A/F)_{in}$ detected by the first air-fuel ratio sensor 16 is read in, and then in step 137, the air-fuel ratio $(A/F)_{out}$ detected by the second air-fuel ratio sensor 18 is read in. Then, in step 138, it is determined whether or not the air-fuel ratio $(A/F)_{in}$ detected by the first air-fuel ratio sensor 16 becomes approximately equal to the air-fuel ratio $(A/F)_{out}$ detected by the second air-fuel ratio sensor 18. At this time, since $(A/F)_{in}$ is not equal to $(A/F)_{out}$, the routine jumps to step 171 shown in FIG. 7F. Then, the processing cycle is completed via step 181.

As illustrated in FIG. 9, $(A/F)_{in}$ becomes approximately equal to $(A/F)_{out}$ a little while after the air-fuel ratio of the mixture is changed over from the lean air-fuel ratio $(A/F)_L$ to the rich air-fuel ratio. If $(A/F)_{in}$ becomes approximately equal to $(A/F)_{out}$, the routine goes from step 138 to step 139, and it is determined whether or not the flag W is set. At this time, since the flag W is reset, the routine goes to step 140, and the count value C is made C1. Accordingly, this C1 represents $\Delta T_R$ in FIG. 5. Then, in step 141, the counter 36 is reset, and then, in step 142, the flag END1 is set. Then, in step 143, the flag W determining a waiting time until the third stage is started is set, and then the routine goes to step 171 shown in FIG. 7F.

In step 171, since it is determined that the flag END1 is set, the routine goes to step 172, and the actual amount of oxygen OS1 which is stored in the three way catalyst is found. As mentioned above, this OS1 is calculated from $\alpha \cdot \Delta(A/F)_R \cdot Ga \cdot \Delta T_R$. In this case, $\alpha$ is a fixed value, and $\Delta(A/F)_R$ is calculated from a difference between the stoichiometric air-fuel ratio and $(A/F)_{in}$ detected by the first air-fuel ratio sensor 16. In addition, Ga is calculated from the output signal of the air flow meter 7, and $\Delta T_R$ is calculated from the count value C1.

If the actual amount of oxygen OS1 is calculated, the routine goes to step 173, and the flag END1 is reset. Then, in step 174, the flag Z1 indicating that the calculation of OS1 is completed is set. Then, in step 175, it is determined whether or not the flag Z1 is set. At this time, since the flag Z is set, the routine goes to step 176, and it is determined whether or not the flag Z2 is set. At this time, since the flag Z2 is reset, the processing cycle is completed.

Figure 7D:
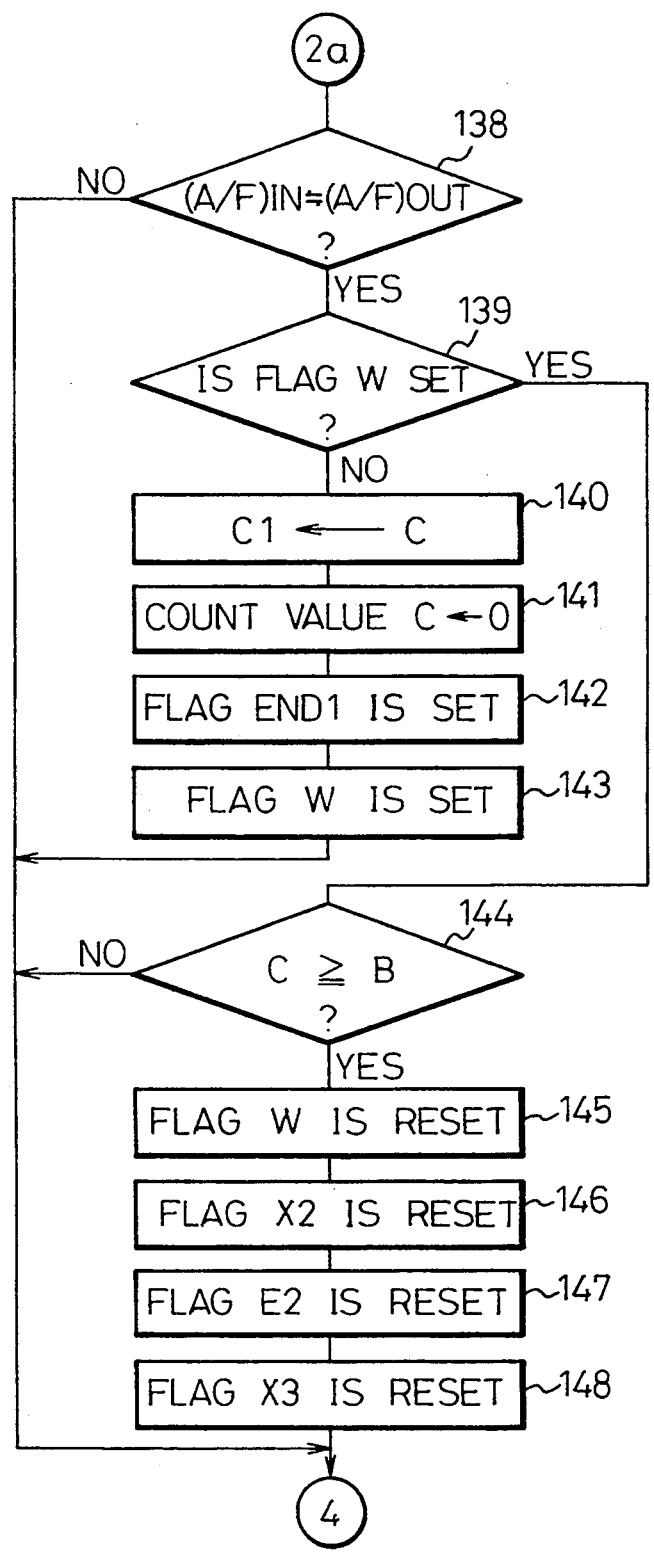

In the next processing cycle, since it is determined in step 139 in FIG. 7D that the flag W is set, the routine goes to step 144. In step 144, it is determined whether or not the count value C exceeds a predetermined value B. This value B is stored in advance in the ROM 22 as a function of the lean air-fuel ratio $(A/F)_L$ and the amount of air Ga detected by the air flow meter 7. When the routine goes to step 144 for the first time, since the count value C is lower than the value B, the routine jumps to step 171 shown in FIG. 7F. Then, the processing cycle is completed via step 181. Note that the predetermined value B is determined so that the oxygen stored in the three way catalyst can be completely released by the time the count value C reaches the value B, in order to improve the accuracy in the following judgement.

When the count value C becomes equal to the predetermined value B, the routine goes from step 144 to step 145, the flag W is reset. Then, in step 146, the flag X2 is reset, and then in step 147, the flag E2 is reset. Then, in step 148, the flag X3 indicating that the third stage should be executed is set, and then the processing cycle is completed.

Figure 7E:
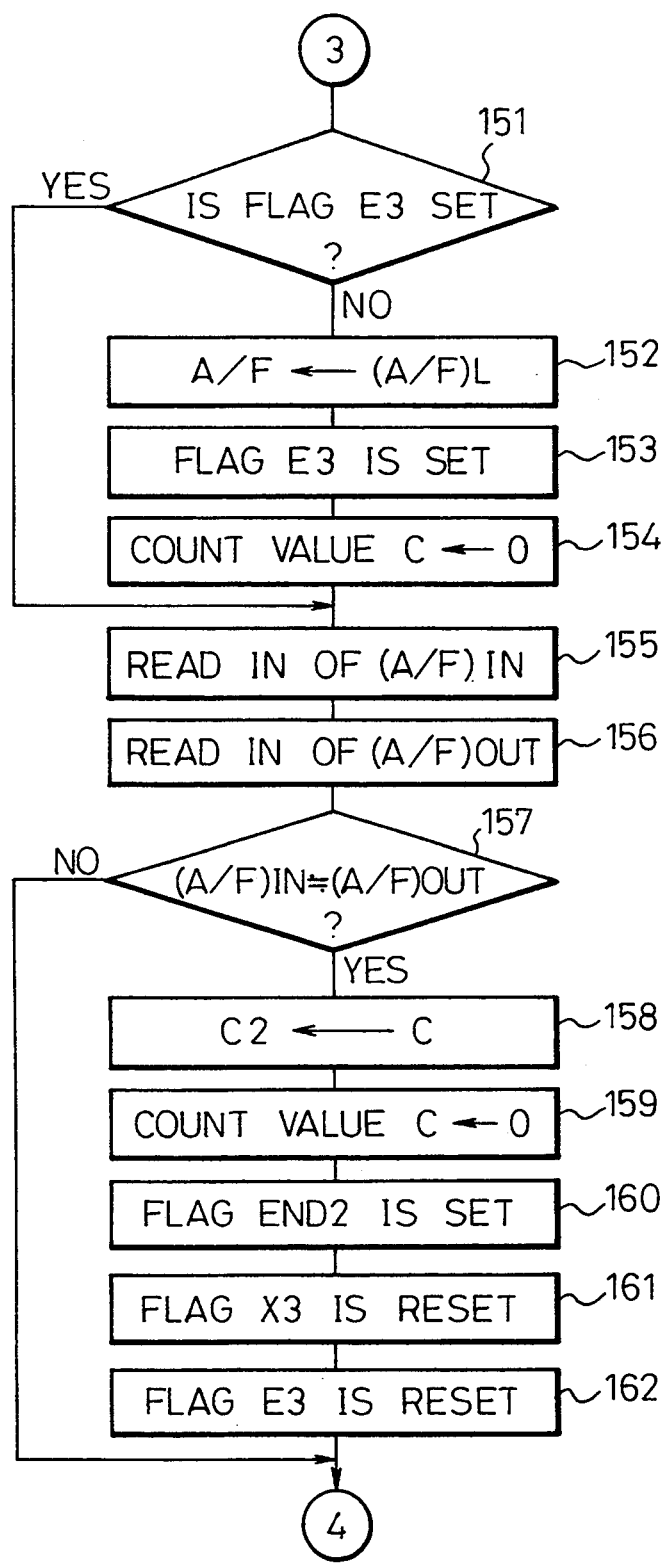
Figure 7F:
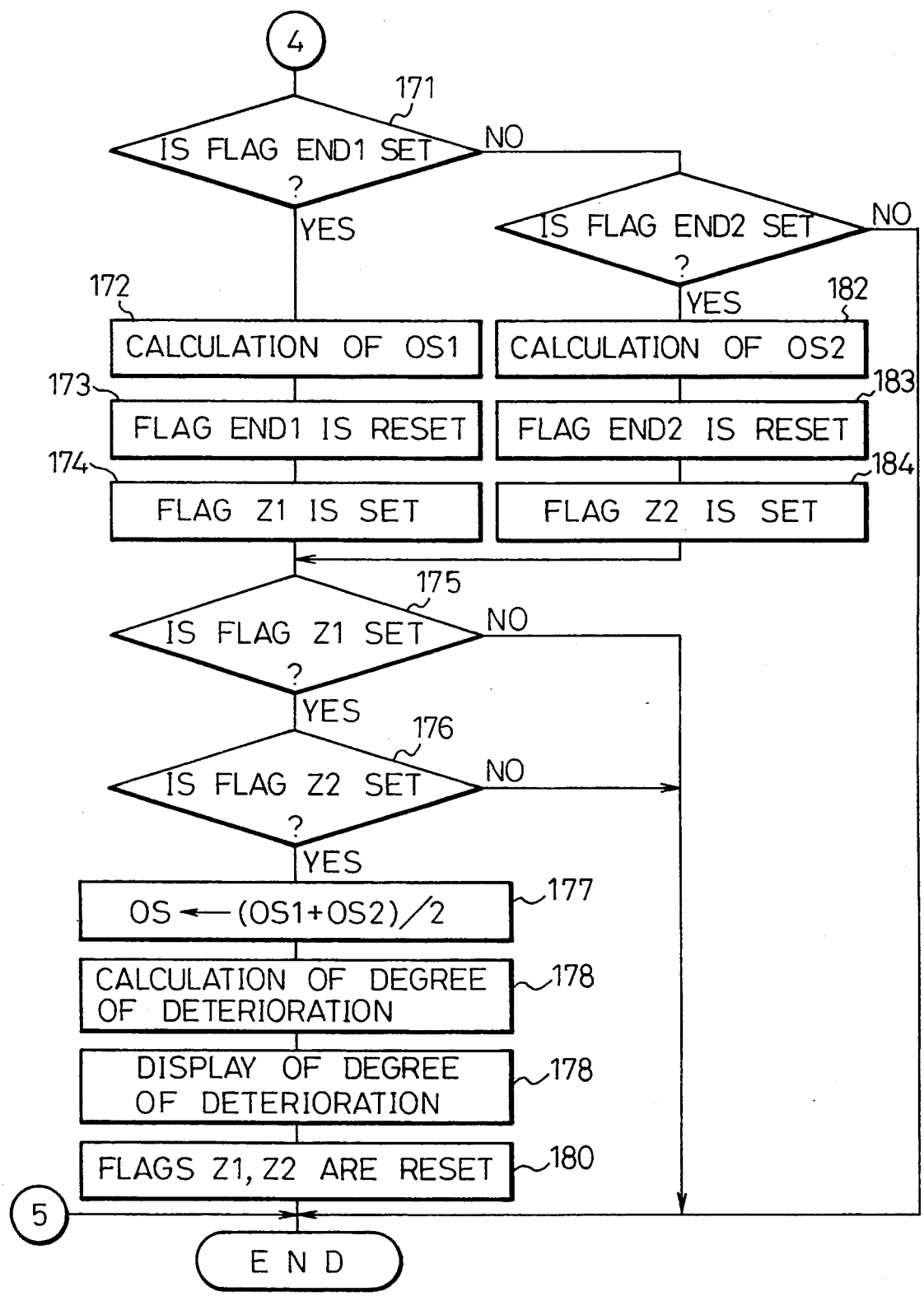

If the flag X2 is reset, and the flag X3 is set, the routine goes to step 150 shown in FIG. 7A to step 151 shown in FIG. 7E. In step 151, it is determined whether or not the flag E3 indicating that the third stage is being executed is set. At this time, since the flag E3 is reset, the routine goes to step 152. In step 152, the air-fuel ratio A/F of the mixture fed into the engine cylinder is made a predetermined lean air-fuel ratio $(A/F)_L$. Namely, the air-fuel ratio determining coefficient M is made a value corresponding to the lean air-fuel ratio $(A/F)_L$, and the feedback correction coefficient FAF is made a fixed value 1.0. Then, in step 153, the flag E3 is set, and then the routine goes to step 154. In step 154, a data indicating that the counter 36 is to be reset is output into the output port 26, and the count value C of the counter 36 is made zero.

Then, in step 155, the air-fuel ratio $(A/F)_{in}$ detected by the first air-fuel ratio sensor 16 is read in, and then in step 156, the air-fuel ratio $(A/F)_{out}$ detected by the second air-fuel ratio sensor 18 is read in. Then, in step 157, it is determined whether or not the air-fuel ratio $(A/F)_{in}$ detected by the first air-fuel ratio sensor 16 becomes approximately equal to the air-fuel ratio $(A/F)_{out}$ detected by the second air-fuel sensor 18. At this time, since $(A/F)_{in}$ is not equal to $(A/F)_{out}$, the routine jumps to step 171. Then, the processing cycle is completed via step 181.

As illustrated in FIG. 9, $(A/F)_{in}$ becomes approximately equal to $(A/F)_{out}$ a little while after the air-fuel ratio of the mixture is changed over from the rich air-fuel ratio $(A/F)_R$ to the lean air-fuel ratio $(A/F)_L$. If $(A/F)_{in}$ becomes approximately equal to $(A/F)_{out}$, the routine goes from step 157 to step 158, and the count value C is made C2. Accordingly, this C2 represents $\Delta T_L$ in FIG. 5. Then, in step 159, the counter 36 is reset, and then in step 160, the flag END2 is set. Then, in step 161, the flag X3 is reset, and then in step 162, the flag E3 is reset. Then, the routine goes to step 181 via step 171.

In step 181, since it is determined that the flag END2 is set, the routine goes to step 182, and the actual amount of oxygen OS2 which is stored in the three way catalyst is found. As mentioned above, this OS2 is calculated from $\alpha \cdot \Delta(A/F)_L \cdot Ga \cdot \Delta T_L$. In this case, $\alpha$ is a fixed value, and $\Delta(A/F)_L$ is calculated from a difference between the stoichiometric air-fuel ratio and $(A/F)_{in}$ detected by the first air-fuel ratio sensor 16. In addition, Ga is calculated from the output signal of the air flow meter 7, and $\Delta T_L$ is calculated from the count value C2.

If the actual amount of oxygen OS2 is calculated, the routine goes to step 183, and the flag END2 is reset. Then, in step 184, the flag Z2 indicating that the calculation of OS2 is completed is set. Then, in step 175, it is determined whether or not the flag Z1 is set. At this time, since the flag Z1 is set, the routine goes to step 176, and it is determined whether or not the flag Z2 is set. At this time, since the flag Z2 is set, the routine goes to step 177.

Figure 6:
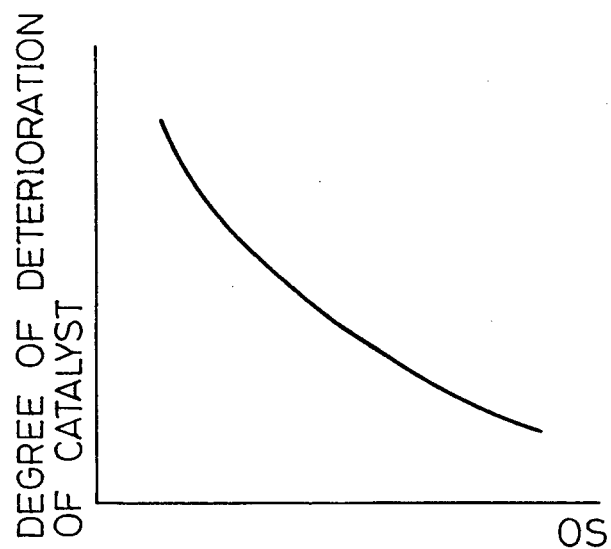
FIG. 6 is a diagram illustrating the degree of deterioration of the catalyst.

In step 177, the mean value of OS1 and OS2 is made OS. Then, in step 178, the degree of deterioration of the three way catalyst is calculated from the relationship illustrated in FIG. 6. Then, in step 179, the degree of deterioration of the three way catalyst is displayed by the display device 35. In this case, the degree of deterioration of the three way catalyst thus calculated may be stored in a so called back-up RAM (not shown) to which a power continues to be supplied from a battery even if the engine is stopped, to retain the information to be memorized. Then, in step 180, the flags Z1 and Z2 are reset.

As mentioned above, FIGS. 8A through 8G illustrate the routine for carrying out the second method.

Referring to FIGS. 8A through 8G, in step 200, it is determined whether or not the condition for executing the detection of deterioration of the catalyst stands. As mentioned above, for example, when the temperature of the cooling water of the engine is higher than a predetermined temperature, when both the air-fuel ratio sensors 16, 18 produce a regular output signal, and when the operating state of the engine is not an idling state, it is determined that the executing condition stands. When the executing condition does not stand, flags X1, X2, X3, E1, E2, E3, END1, END2, Z1, Z2 and W which are used in this routine are reset in steps 201, 202, 203 and 204, and then in step 205, OS1, OS2, $\Delta$OS are cleared. Then, the processing cycle is completed.

If the executing condition stands, the routine goes from step 200 to step 210, and it is determined whether or not the flag X1, is set. At this time, since the flag X1 is reset, the routine goes to step 230, and it is determined whether or not the flag X2 is set. At this time, since the flag X2 is reset, the routine goes to step 260, and it is determined whether or not the flag X3 is set. At this time, since the flag X3 is reset, the routine goes to step 280. In step 280, the flag X1 indicating that the first stage should be executed is set. Then, the routine goes to step 281 shown in FIG. 8G, and it is determined whether or not the flag END1 is set. At this time, since the flag END1 is reset, the routine goes to step 290, and it is determined whether or not the flag END2 is set. At this time, since the flag END2 is reset, the processing cycle is completed.

Figure 8A:
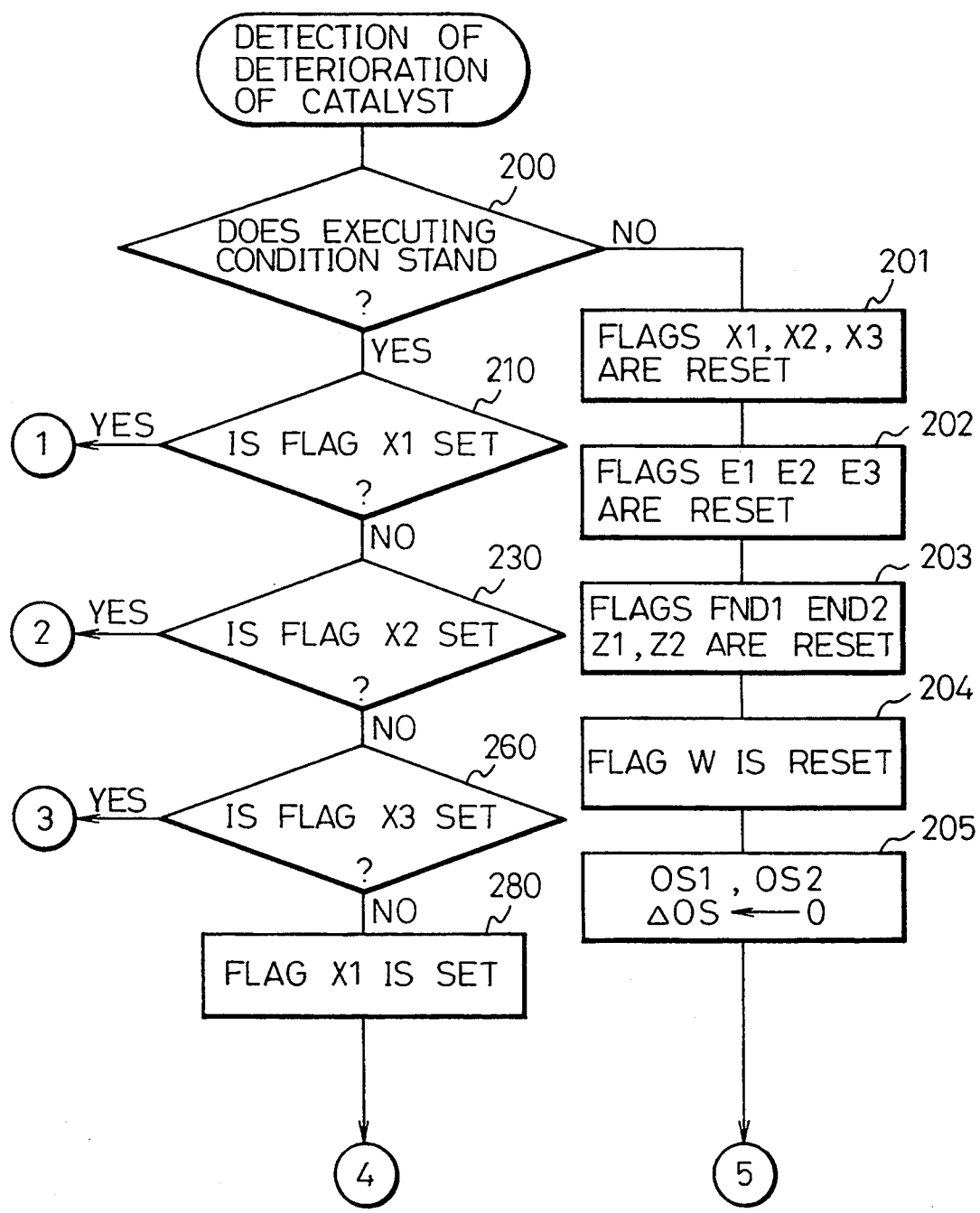
FIGS. 8A through 8G are a flow chart of another embodiment for detecting the degree of deterioration of the catalyst.
Figure 8B:
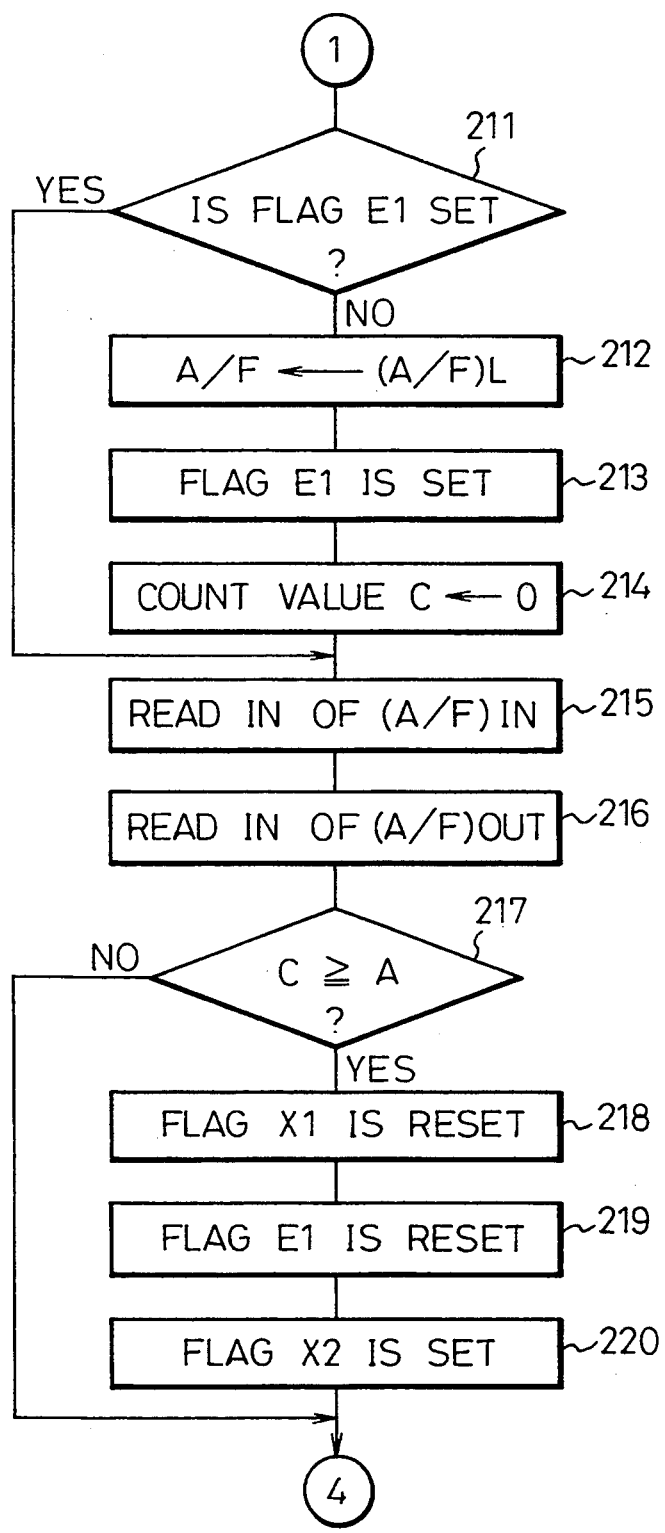
Figure 9:
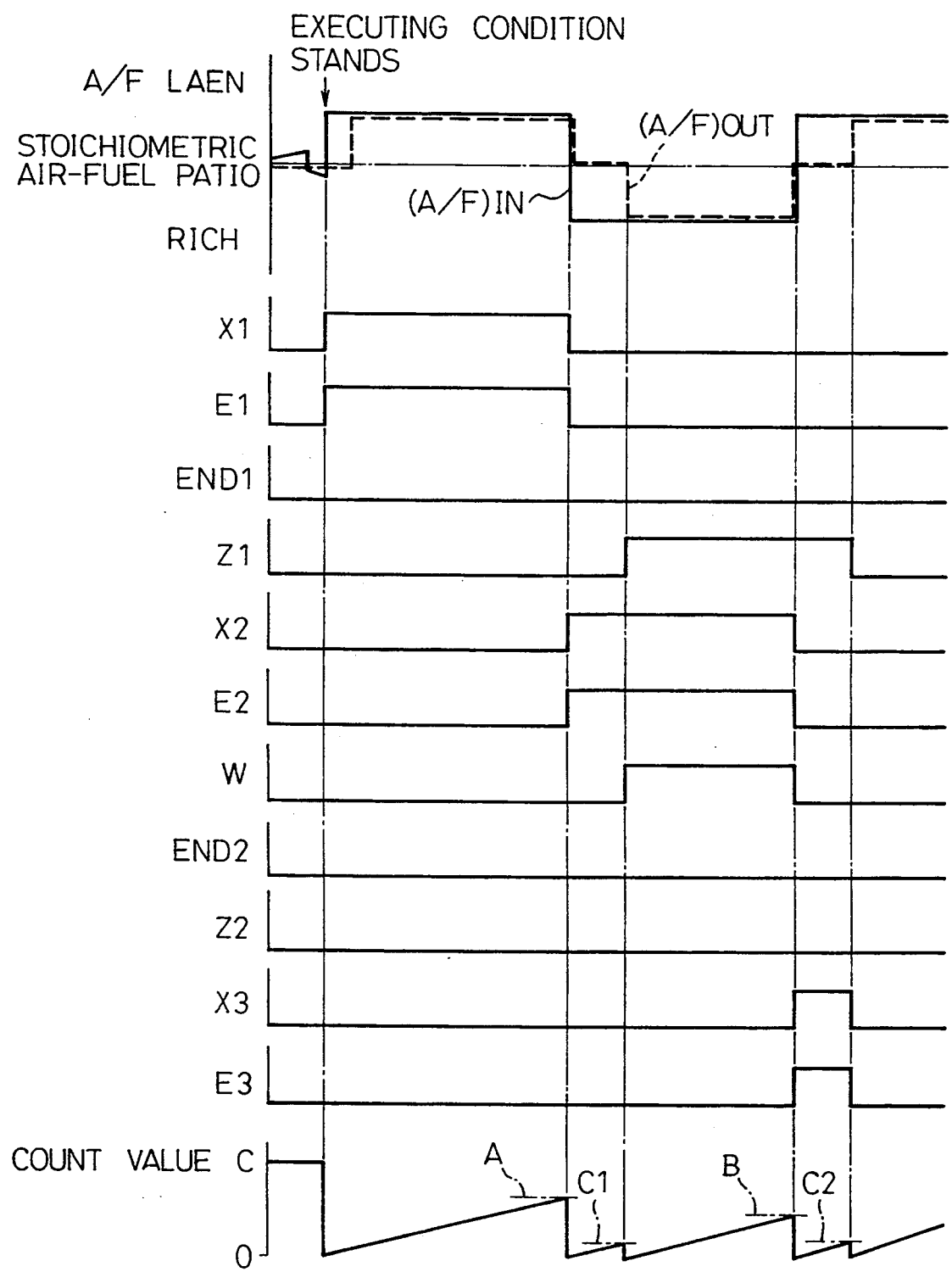
FIG. 9 is a time chart.

In the next processing cycle, since it is determined in step 210, shown in FIG. 8A, that the flag X1 is set, the routine goes to step 211 shown in FIG. 8B. In step 211, it is determined whether or not the flag E1 indicating that the first stage is being executed is set. At this time, since the flag E1 is reset, the routine goes to step 212. In step 212, the air-fuel ratio A/F of the mixture fed into the engine cylinder is made the predetermined lean air-fuel ratio $(A/F)_L$. Namely, the air-fuel ratio determining coefficient M is made a value corresponding to the lean air-fuel ratio $(A/F)_L$, and the feedback correction coefficient FAF is made a fixed value 1.0. Then, in step 213, the flag E1 is set, and then the routine goes to step 214. In step 214, a data indicating that the counter 36 is to be reset is output to the output port 26, and thereby the count value of the counter 36 is made zero. When the counter 36 is reset, the counting up operation of the counter 36 is instantaneously started.

Then, in step 215, the air-fuel ratio $(A/F)_{in}$ detected by the first air-fuel ratio sensor 16 is read in, and then, in step 216, the air-fuel ratio $(A/F)_{out}$ detected by the second air-fuel ratio sensor 18 is read in. Then, in step 217, it is determined whether or not the count value C exceeds a predetermined value A. This value A is stored in advance in the ROM 22 as a function of the lean air-fuel ratio $(A/F)_L$ and the amount of air Ga detected by the air-flow meter 7. When the routine goes to step 217 for the first time, since the count value C is lower than the value A, the routine jumps to step 281 shown in FIG. 8G, and then the processing cycle is completed via step 290.

In the next processing cycle, the routine jumps from step 211 to step 215. When the count value C becomes equal to the value A, the routine goes from step 217 to step 218, and the flag X1 is reset. Then, in step 219, the flag E1 is reset. Then, in step 220, the flag X2 indicating that the second stage should be executed is set, and then the processing cycle is completed.

Figure 8C:
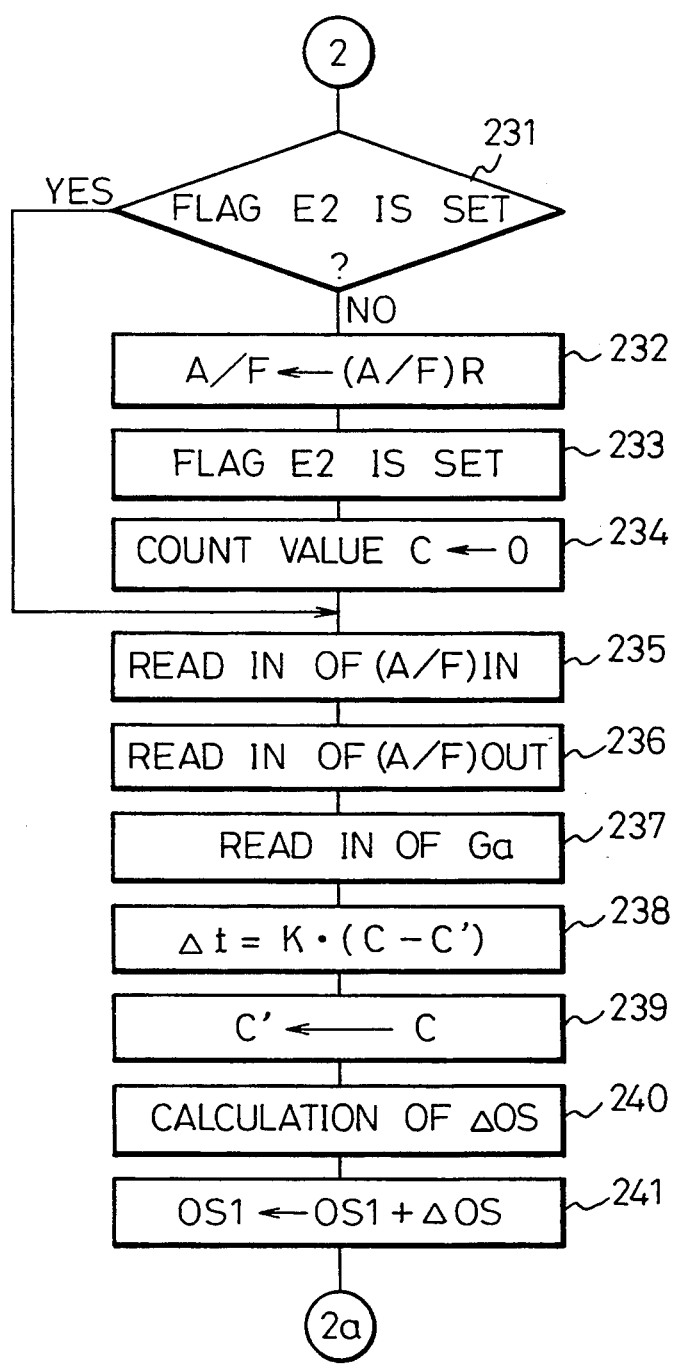

If the flag X1 is reset, and the flag X2 is set, the routine goes from step 230 shown in FIG. 8A to step 231 shown in FIG. 8C in the next processing cycle. In step 231, it is determined whether or not the flag E2 indicating that the second stage is being executed is set. At this time, since the flag E2 is reset, the routine goes to step 232. In step 232, the air-fuel ratio A/F of the mixture fed into the engine cylinder is made a predetermined rich air-fuel ratio $(A/F)_R$. Namely, the air-fuel ratio determining coefficient M is made a value corresponding to the rich air-fuel ratio $(A/F)_R$, and the feedback correction coefficient FAF is made a fixed value 1.0. Accordingly, as can be seen from FIG. 9, when the count value C reaches the predetermined value A, the air-fuel ratio of the mixture fed into the engine is changed over from the lean air-fuel ratio $(A/F)_L$ to the rich air-fuel ratio $(A/F)_R$. Then, in step 233, the flag E2 is set, and then the routine goes to step 234. In step 234, a data indicating that the counter 36 is to be reset is output to the output port 26, and thereby the count value C of the counter 36 is made zero. When the counter 36 is reset, the counting up operation of the counter 36 is instantaneously started.

Then, in step 235, the air-fuel ratio $(A/F)_{in}$ detected by the first air-fuel ratio sensor 16 is read in, and then in step 236, the air-fuel ratio $(A/F)_{out}$ detected by the second air-fuel ratio sensor 18 is read in. Then, in step 237, the amount of air Ga detected by the air flow meter 7 is read in. Then, in step 238, $K \cdot (C-C')$ is made At, and then in step 139, the count value C is made C'. Namely, in step 238, the count value C' in the previous processing cycle is subtracted from the current count value C, and At is calculated by multiplying the result of subtraction $(C-C')$ by a coefficient K used for converting the count value to time. Accordingly, At indicates a length of time from when At was calculated in the previous processing cycle to when At is calculated in the current processing cycle.

Then, in step 240, the actual amount of oxygen which is absorbed and stored in the three way catalyst during the At is calculated. This $\Delta OS$ is calculated from $\alpha \cdot \Delta (A/F)_R \cdot Ga \cdot \Delta t$. In this case, $\alpha$ is a fixed value, and $\Delta(A/F)_R$ is calculated from a difference between the stoichiometric air-fuel ratio and $(A/F)_{in}$ detected by the first air-fuel ratio sensor 16. In addition, Ga has been calculated from the output signal of the air flow meter 7 in step 237, and At has been calculated based on the count value C in step 238. Then, in step 241, $\Delta OS$ is added to OS1. Then, the routine goes to step 242 in FIG. 8D. In step 242, it is determined whether or not the air-fuel ratio $(A/F)_{in}$ detected by the first air-fuel ratio sensor 16 becomes approximately equal to the air-fuel ratio $(A/F)_{out}$ detected by the second air-fuel ratio sensor 18. At this time, since $(A/F)_{in}$ is not equal to $(A/F)_{out}$, the routine jumps to step 281 shown in FIG. 8G. Then, the processing cycle is completed via step 290.

As illustrated in FIG. 9, $(A/F)_{in}$ becomes approximately equal to $(A/F)_{out}$ a little while after the air-fuel ratio of the mixture is changed over from the lean air-fuel ratio $(A/F)_L$ to the rich air-fuel ratio. If $(A/F)_{in}$ becomes approximately equal to $(A/F)_{out}$, the routine goes from step 242 to step 243, and it is determined whether or not the flag W is set. At this time, since the flag W is reset, the routine goes to step 244. In step 244, AS is made zero, and thus the calculation of OS1 is completed. Accordingly, OS1 represents the actual amount of oxygen which has been stored in the three way catalyst during $\Delta T_R$ in FIG. 5. Then, in step 245, the counter 36 is reset, and then, in step 246, the flag END1 is set. Then, in step 247, the flag W determining a waiting time until the third stage is started is set, and then the routine goes to step 281 shown in FIG. 8G.

In step 281, since it is determined that the flag END1 is set, the routine goes to step 282, and the flag END1 is reset. Then, in step 283, the flag Z1 indicating that the calculation of OS1 is completed is set. Then, in step 284, it is determined whether or not the flag Z1 is set. At this time, since the flag Z is set, the routine goes to step 285, and it is determined whether or not the flag Z2 is set. At this time, since the flag Z2 is reset, the processing cycle is completed.

Figure 8D:
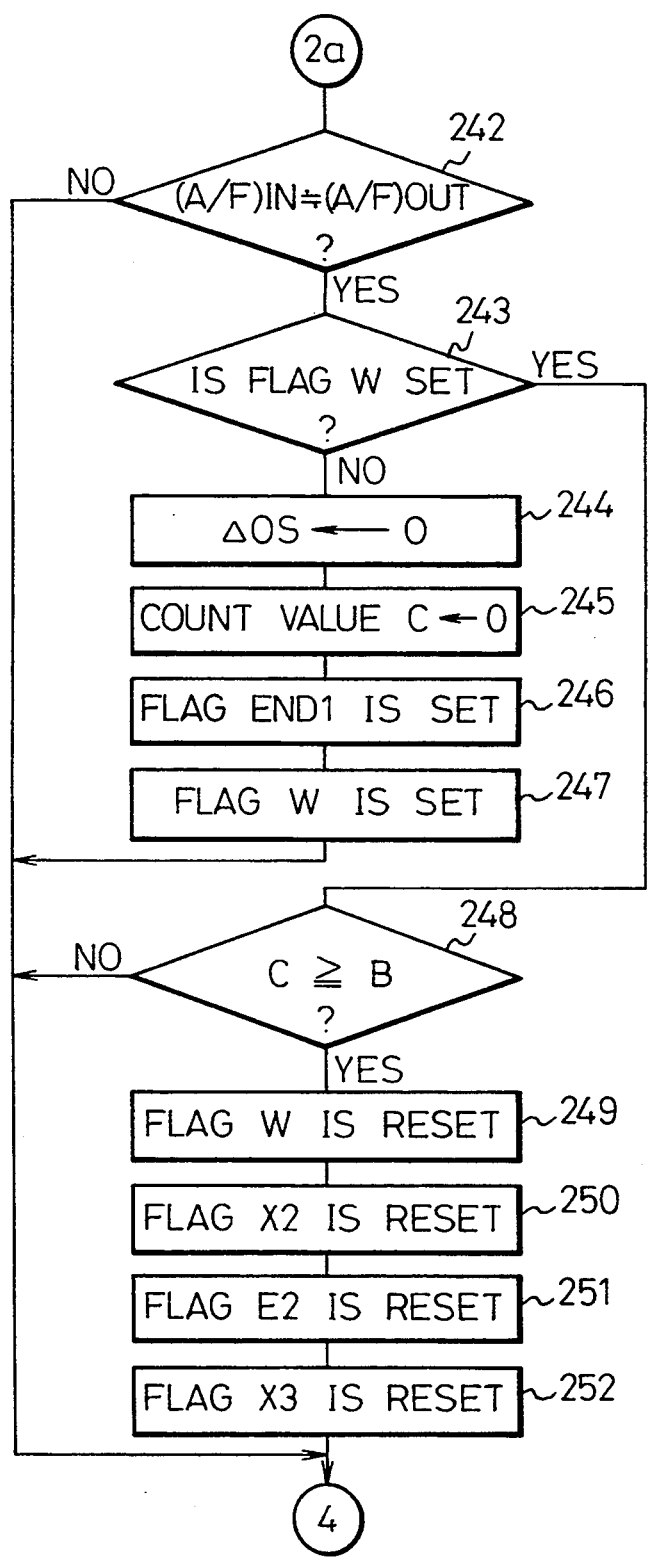

In the next processing cycle, since it is determined in step 243 in FIG. 8D that the flag W is set, the routine goes to step 248. In step 248, it is determined whether or not the count value C exceeds a predetermined value B. This value B is stored in advance in the ROM 22 as a function of the lean air-fuel ratio $(A/F)_L$ and the amount of air Ga detected by the air flow meter 7. When the routine goes to step 248 for the first time, since the count value C is lower than the value B, the routine jumps to step 281 shown in FIG. 8G. Then, the processing cycle is completed via step 290.

When the count value C becomes equal to the predetermined value B, the routine goes from step 248 to step 249, the flag W is reset. Then, in step 250, the flag X2 is reset, and then in step 251, the flag E2 is reset. Then, in step 252, the flag X3 indicating that the third stage should be executed is set, and then the processing cycle is completed.

Figure 8E:
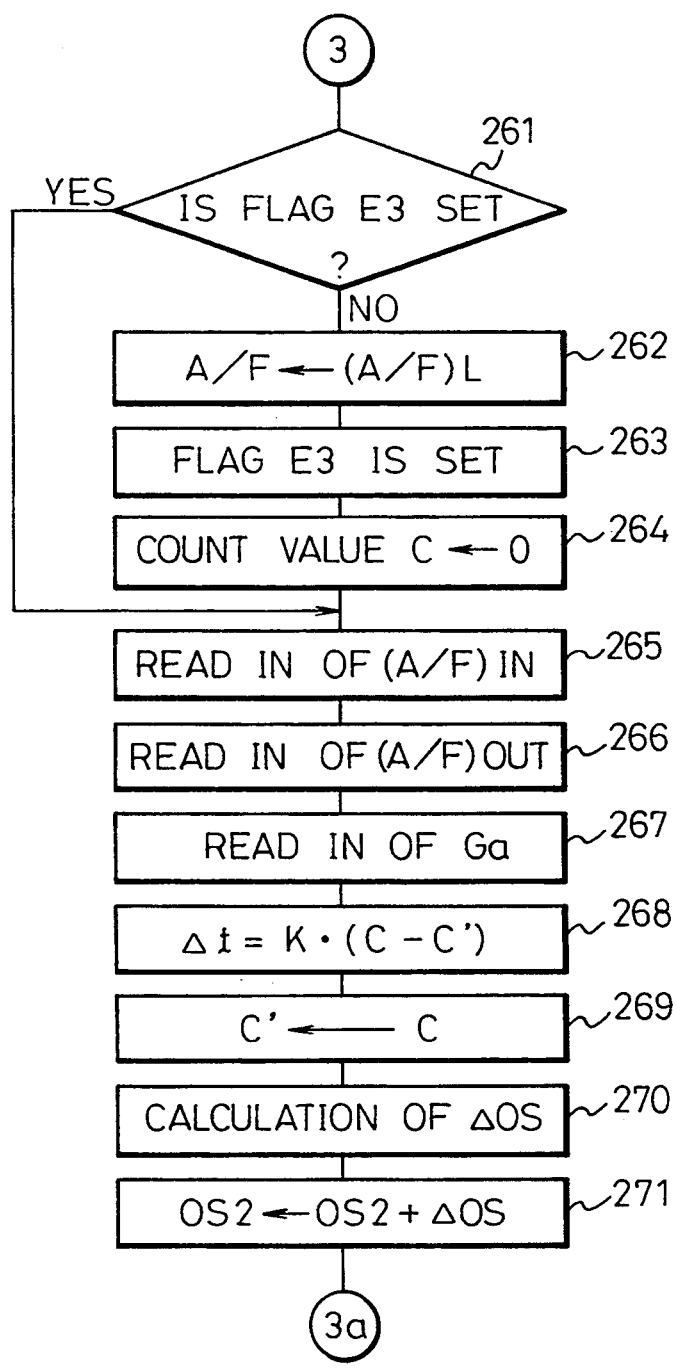
Figure 8F:
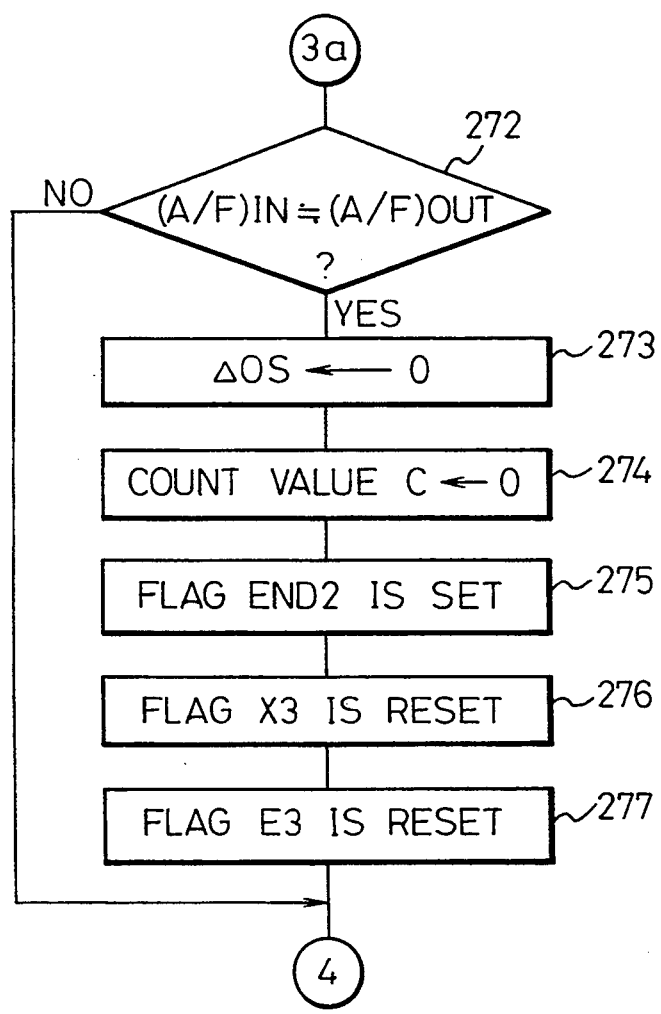
Figure 8G:
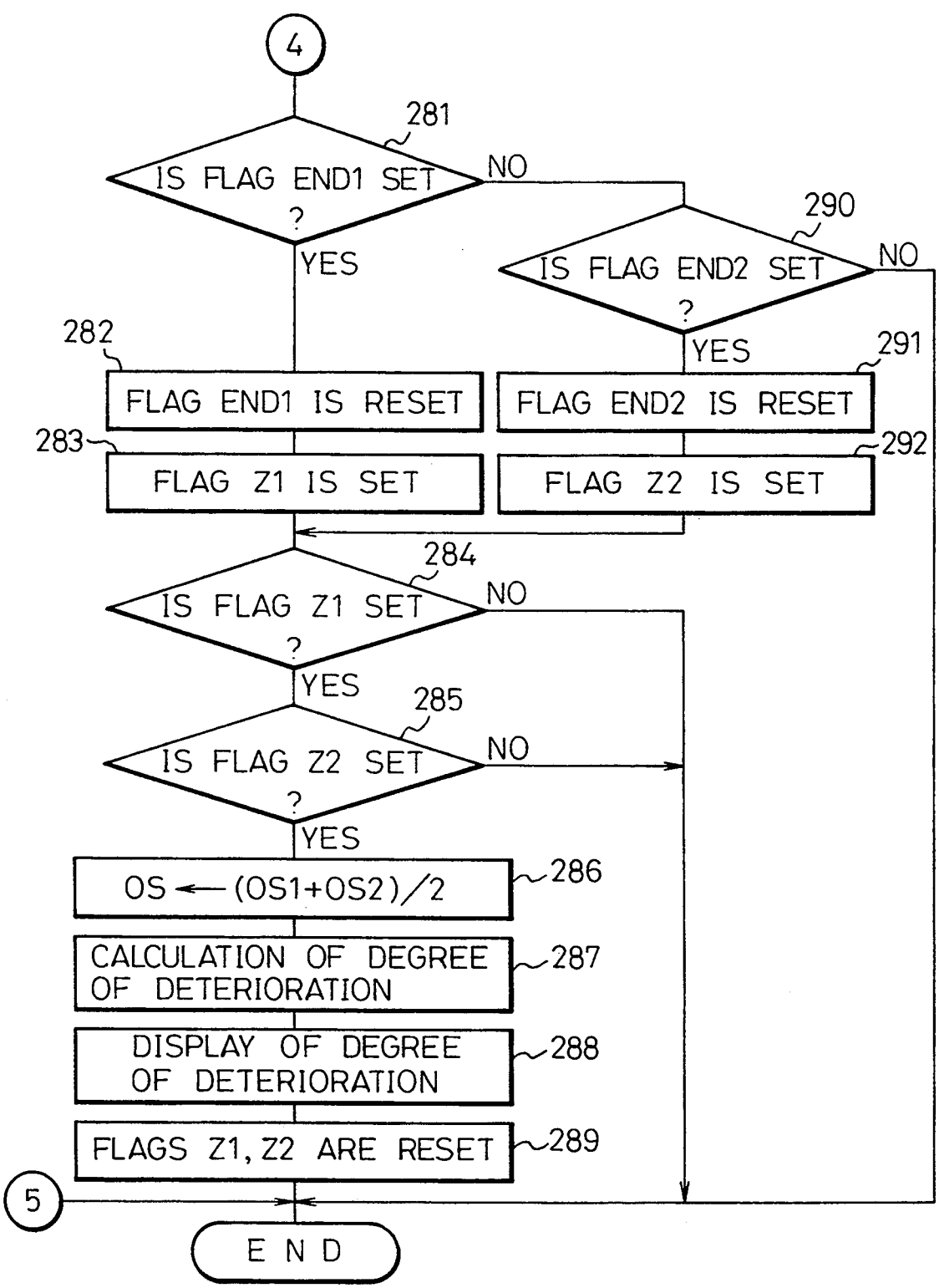

If the flag X2 is reset, and the flag X3 is set, the routine goes to step 260 shown in FIG. 8A to step 261 shown in FIG. 8E. In step 261, it is determined whether or not the flag E3 indicating that the third stage is being executed is set. At this time, since the flag E3 is reset, the routine goes to step 162. In step 162, the air-fuel ratio A/F of the mixture fed into the engine cylinder is made a predetermined lean air-fuel ratio $(A/F)_L$. Namely, the air-fuel ratio determining coefficient M is made a value corresponding to the lean air-fuel ratio $(A/F)_L$, and the feedback correction coefficient FAF is made a fixed value 1.0. Then, in step 263, the flag E3 is set, and then the routine goes to step 264. In step 264, a data indicating that the counter 36 is to be reset is output into the output port 26, and the count value C of the counter 36 is made zero.

Then, in step 265, the air-fuel ratio $(A/F)_{in}$ detected by the first air-fuel ratio sensor 16 is read in, and then in step 266, the air-fuel ratio $(A/F)_{out}$ detected by the second air-fuel ratio sensor 18 is read in. Then, in step 267, the amount of air Ga detected by the air flow meter 7 is read in. Then, in step 268, $K \cdot (C-C')$ is made at, and then in step 269, the count value C is made C'. Namely, in step 268, the count value C' in the previous processing cycle is subtracted from the current count value C, and At is calculated by multiplying the result of subtraction $(C-C')$ by a coefficient K used for converting the count value to time. Accordingly, At indicates a length of time from when At was calculated in the previous processing cycle to when At is calculated in the current processing cycle.

Then, in step 270, the actual amount of oxygen $\Delta OS$ which is absorbed and stored in the three way catalyst during the at is calculated. This $\Delta OS$ is calculated from $\alpha \cdot \Delta(A/F)_L \cdot Ga \cdot \Delta t$. In this case, $\alpha$ is a fixed value, and $\Delta(A/F)_L$ is calculated from a difference between the stoichiometric air-fuel ratio and $(A/F)_{in}$ detected by the first air-fuel ratio sensor 16. In addition, Ga has been calculated from the output signal of the air flow meter 7 in step 267, and At has been calculated based on the count value C in step 268. Then, in step 271, $\Delta OS$ is added to OS2. Then, the routine goes to step 272 in FIG. 8F. In step 272, it is determined whether or not the air-fuel ratio $(A/F)_{in}$ detected by the first air-fuel ratio sensor 16 becomes approximately equal to the air-fuel ratio $(A/F)_{out}$ detected by the second air-fuel sensor 18. At this time, since $(A/F)_{in}$ is not equal to $(A/F)_{out}$, the routine jumps to step 281. Then, the processing cycle is completed via step 290.

As illustrated in FIG. 9, $(A/F)_{in}$ becomes approximately equal to $(A/F)_{out}$ a little while after the air-fuel ratio of the mixture is changed over from the rich air-fuel ratio (A/F)$_R$ to the lean air-fuel ratio (A/F)$_L$. If (A/F)$_{in}$ becomes approximately equal to (A/F)$_{out}$, the routine goes from step 272 to step 273. In step 273, ΔS is made zero, and thus, the calculation of OS2 is completed. Accordingly, OS2 represents the actual amount of oxygen which is stored in the three way catalyst during ΔT$_L$. Then, in step 274, the counter 36 is reset, and then in step 275, the flag END2 is set. Then, in step 276, the flag X3 is reset, and then in step 277, the flag E3 is reset. Then, the routine goes to step 290 via step 281.

In step 290, since it is determined that the flag END2 is set, the routine goes to step 291, and the flag END2 is reset. Then, in step 292, the flag Z2 indicating that the calculation of OS2 is completed is set. Then, in step 284, it is determined whether or not the flag Z1 is set. At this time, since the flag Z1 is set, the routine goes to step 285, and it is determined whether or not the flag Z2 is set. At this time, since the flag Z2 is set, the routine goes to step 286.

In step 286, the mean value of OS1 and OS2 is made OS. Then, in step 287 the degree of deterioration of the three way catalyst is calculated from the relationship illustrated in FIG. 6. Then, in step 288, the degree of deterioration of the three way catalyst is displayed by the display device 35. Then, in step 289, the flags Z1 and Z2 are reset.

According to the present invention, since the actual amount of oxygen which can be absorbed and stored in the catalyst can be detected, it is possible to correctly detect the degree of deterioration of the catalyst.

While the invention has been described by reference to specific embodiments chosen for purposes of illustration, it should be apparent that numerous modifications could be made thereto by those skilled in the art without departing from the basic concept and scope of the invention.

We claim:

1. A device for detecting the degree of deterioration of a catalyst having an oxygen storage function, said device comprising:
   an exhaust gas passage in which the catalyst is arranged, wherein an exhaust gas is produced by burning fuel flowing within said exhaust gas passage;
   an air-fuel ratio sensor arranged in said exhaust gas passage downstream of the catalyst to detect an air-fuel ratio;
   air-fuel ratio changeover means for changing over the air-fuel ratio at an upstream side of the catalyst between a predetermined rich air-fuel ratio and a predetermined lean air-fuel ratio;
   gas amount detecting means for detecting an amount of the exhaust gas passing through the catalyst during a time from when the air-fuel ratio is changed over from one of said predetermined rich air-fuel ratio and said predetermined lean air-fuel ratio to the other predetermined air-fuel ratio to when the air-fuel ratio detected by said air-fuel ratio sensor becomes approximately equal to the other predetermined air-fuel ratio;
   calculating means for calculating an amount of oxygen stored in the catalyst based on said detected amount of the exhaust gas and a difference between the other predetermined air-fuel ratio and a stoichiometric air-fuel ratio; and
   deterioration determining means for determining a degree of deterioration of the catalyst on the basis of said calculated amount of oxygen stored in the catalyst.

2. A device according to claim 1, further comprising an additional air-fuel ratio sensor arranged in said exhaust gas passage upstream of the catalyst to detect an air-fuel ratio, said gas amount detecting means detecting the amount of the exhaust gas passing through the catalyst during a time from when the air-fuel ratio is changed over from one of said predetermined rich air-fuel ratio and said predetermined lean air-fuel ratio to the other predetermined air-fuel ratio to when the air-fuel ratio detected by said air-fuel ratio sensor arranged downstream of the catalyst becomes approximately equal to the air-fuel ratio detected by said additional air-fuel ratio sensor, said calculating means calculating the amount of oxygen stored in the catalyst from said amount of the exhaust gas and a difference between the stoichiometric air-fuel ratio and the air-fuel ratio detected by said additional air-fuel ratio sensor.

3. A device according to claim 1, wherein said air-fuel ratio changeover means changes over the air-fuel ratio with a time interval from said predetermined lean air-fuel ratio to said predetermined rich air-fuel ratio and from said predetermined rich air-fuel ratio to said predetermined lean air-fuel ratio, and said deterioration determining means determines the degree of deterioration of the catalyst on the basis of a mean value of said amount of oxygen calculated by said calculating means when the air-fuel ratio is changed over from said predetermined lean air-fuel ratio to said predetermined rich air-fuel ratio and said amount of oxygen calculated by said calculating means when the air-fuel ratio is changed over from said predetermined rich air-fuel ratio to said predetermined lean air-fuel ratio.

4. A device according to claim 1, wherein said calculating means calculates said amount of oxygen OS on the basis of the following formula:

$$OS = \alpha \cdot \Delta(A/F) \cdot Ga \cdot \Delta T$$

where $\alpha$ is a ratio of the amount of oxygen contained in air, $\Delta(A/F)$ is said difference between the other predetermined air-fuel ratio and the stoichiometric air-fuel ratio, Ga is said amount of the exhaust gas detected by said gas amount detecting means and $\Delta T$ is said time from when air-fuel ratio is changed over from said predetermined rich air-fuel ratio and said predetermined lean air-fuel ratio to the other predetermined air-fuel ratio to when the air-fuel ratio detected by said air-fuel ratio sensor becomes approximately equal to the other predetermined air-fuel ratio.

5. A device according to claim 4, wherein said gas amount detecting means detects an amount of air fed for burning the fuel and uses said amount of the air as an amount representing the amount of the exhaust gas.

6. A device according to claim 1, wherein said gas amount detecting means successively detects the amount of the exhaust gas passing through the catalyst per a given time during the time from when the air-fuel ratio is changed over from one of said predetermined rich air-fuel ratio and said predetermined lean air-fuel ratio to the other predetermined air-fuel ratio to when the air-fuel ratio detected by said air-fuel ratio sensor becomes approximately equal to the other predetermined air-fuel ratio, and said calculating means calculates a total amount of oxygen stored in the catalyst based on a sum of an amount of air calculated from said amount of the exhaust gas per said given time and a difference between the other predetermined air-fuel ratio and the stoichiometric air-fuel ratio.

7. A device according to claim 6, wherein said calculating means calculates said total amount of oxygen OS on the basis of the following formulas:

$$\Delta OS = \alpha \cdot \Delta(A/F) \cdot Ga \cdot \Delta t$$

$$OS = [\Sigma \Delta S] \Sigma \Delta OS$$

where $\Delta OS$ is said amount of oxygen stored in the catalyst per said given time, $\alpha$ is a ratio of the amount of oxygen contained in air, $\Delta(A/F)$ is said difference between the other predetermined air-fuel ratio and the stoichiometric air-fuel ratio, Ga is said amount of the exhaust gas detected by said gas amount detecting means, and $\Delta t$ is said given time.

8. A device according to claim 7, wherein said gas amount detecting means detects an amount of air fed for burning the fuel and uses said amount of the air as an amount representing the amount of the exhaust gas.

9. A device according to claim 1, wherein said air-fuel ratio changeover means maintains the air-fuel ratio at one of said predetermined rich air-fuel ratio and said predetermined lean air-fuel ratio for a predetermined time before changing over the air-fuel ratio, and said calculating means starts to calculate said amount of oxygen when said air-fuel ratio changeover means changes over the air-fuel ratio.

10. A device according to claim 1, wherein said device is used in an engine and said air-fuel ratio changeover means changes the air-fuel ratio of an air-fuel mixture fed into the engine between said predetermined rich air-fuel ratio and said predetermined lean air-fuel ratio.

11. A device according to claim 10, further comprising memory means for storing said predetermined rich air-fuel ratio and said predetermined lean air-fuel ratio, said air-fuel ratio changeover means controlling an amount of fuel fed into the engine to make the air-fuel ratio of said air-fuel mixture equal to one of said predetermined rich air-fuel ratio and said predetermined lean air-fuel ratio.

12. A device according to claim 11, further comprising an additional air-fuel ratio sensor arranged in said exhaust gas passage upstream of the catalyst to detect an air-fuel ratio, said air-fuel ratio changeover means controlling the amount of fuel fed into the engine on the basis of an output signal of said additional air-fuel ratio sensor to make the air-fuel ratio detected by said additional air-fuel ratio sensor equal to one of said predetermined rich air-fuel ratio and said predetermined lean air-fuel ratio which are stored by said memory means.

13. A device according to claim 12, in which the engine has a fuel injector for feeding fuel into the engine, wherein a fuel injection time TAU by said fuel injector is calculated based on the following formula:

$$TAU = TP \cdot FAF \cdot GA \cdot M$$

where TP is a basic fuel injection time determined by an operating state of the engine, FAF is a feedback correction coefficient increasing and decreasing relative to a reference value in accordance with a change in the air-fuel ratio detected by said additional air-fuel ratio sensor to make the air-fuel ratio of said air-fuel mixture equal to a target air-fuel ratio, GA is a learning coefficient for maintaining the value of FAF at said reference value, and M is an air-fuel ratio determining coefficient represented by the stoichiometric air-fuel ratio/said target air-fuel ratio.

14. A device according to claim 13, wherein said air-fuel ratio changeover means makes the value of FAF said reference value and makes said target air-fuel ratio one of said predetermined rich air-fuel ratio and said predetermined lean air-fuel ratio when the air-fuel ratio of said air-fuel mixture is equal to one of said predetermined rich air-fuel ratio and said predetermined lean air-fuel ratio.

* * * * *